US012789100B2

(12) United States Patent
Hickey

(10) Patent No.: US 12,789,100 B2
(45) Date of Patent: Nov. 10, 2026

(54) SYSTEM AND METHOD FOR MANAGING INTERACTIONS BETWEEN USERS OF CLIENT APPLICATIONS

(71) Applicant: Skillz Platform Inc., San Francisco, CA (US)

(72) Inventor: Brent Michael Hickey, Boulder City, NV (US)

(73) Assignee: Skillz Platform Inc., Las Vegas, NV (US)

( * ) Notice: Subject to any disclaimer, the term of this patent is extended or adjusted under 35 U.S.C. 154(b) by 265 days.

(21) Appl. No.: 18/606,949

(22) Filed: Mar. 15, 2024

(65) Prior Publication Data

US 2024/0307785 A1 Sep. 19, 2024

Related U.S. Application Data

(60) Provisional application No. 63/490,634, filed on Mar. 16, 2023.

(51) Int. Cl.
*A63F 13/795* (2014.01)

(52) U.S. Cl.
CPC .................................. *A63F 13/795* (2014.09)

(58) Field of Classification Search
None
See application file for complete search history.

(56) References Cited

U.S. PATENT DOCUMENTS

| | | | | |
|---|---|---|---|---|
| 2017/0242569 | A1* | 8/2017 | Frind | G06F 3/04845 |
| 2020/0023277 | A1* | 1/2020 | Chow | A63F 13/798 |
| 2021/0299574 | A1 | 9/2021 | Pare et al. | |
| 2022/0362679 | A1* | 11/2022 | Meckel | A63F 13/795 |
| 2023/0347250 | A1* | 11/2023 | Meckel | A63F 13/795 |
| 2024/0307785 | A1* | 9/2024 | Hickey | A63F 13/795 |
| 2024/0342618 | A1* | 10/2024 | Meckel | A63F 13/795 |
| 2025/0367562 | A1* | 12/2025 | Meckel | A63F 13/795 |

FOREIGN PATENT DOCUMENTS

WO 2006124811 A2 11/2006

* cited by examiner

*Primary Examiner* — Ronald Laneau
(74) *Attorney, Agent, or Firm* — Mintz, Levin, Cohn, Ferris, Glovsky and Popeo, P.C.

(57) ABSTRACT

At least a method for managing interactions between users of client applications is contemplated. The method can include receiving a first request from a first client device for initiating an electronic interactive session in the client application with additional client devices, receiving a second request from a second client device to initiate the electronic interactive session in the client application with the one or more additional client devices, determining the electronic interactive session between the first client device and the second client device based on an identification of a match between one of the first plurality of interaction templates and one of the second plurality of interaction templates selected on the second client device, allocating a client application server from a pool of pre-instantiated client application servers for use with the client application, and providing the electronic interactive session between the first client device and the second client device.

19 Claims, 5 Drawing Sheets

300

400

SYSTEM AND METHOD FOR MANAGING INTERACTIONS BETWEEN USERS OF CLIENT APPLICATIONS

CROSS REFERENCE TO RELATED APPLICATION

This application claims the benefit of a U.S. Provisional Patent Application having U.S. Provisional Patent Application No. 63/490,634, filed Mar. 16, 2023. The contents of the U.S. Provisional Patent Application having U.S. Provisional Patent Application No. 63/490,634 is incorporated by reference herein in its entirety.

BACKGROUND OF THE INVENTION

Users of client applications can engage or otherwise interact with other users of those client applications in a variety of ways. For example, users can compete against other users in client applications to win prizes or other achievements. One of the factors that can affect a user's experience in a client application is the quality of the opponent against whom the user is competing or otherwise interacting. A large disparity between opponents, such as in their respective ability or skill levels, can adversely affect each user's experience in the client application. For example, if a beginner is paired against an expert in a competition, neither the beginner nor the expert may find the competition interesting or even fair, as the beginner may become frustrated at having little to no chance of winning while the expert may become frustrated by competing against an opponent that offers little to no challenge. Another factor that can affect a user's experience in a client application is the time taken to find an opponent. Longer wait times can frustrate users, which can lead to user churn.

SUMMARY OF THE INVENTION

The present invention is directed to a system and method for managing interactions between users of client applications. According to the present invention, users of client applications can be automatically matched with other users of those client applications, for example, to compete against or otherwise interact or engage with each other within the client application. The present invention can promote fair competition and other appropriate interactions in the client applications by matching users of like skill, ability, and/or other characteristics. The present invention can match users more quickly by allowing users to simultaneously enter queues for multiple templates with multiple interaction modes of the client application.

In an aspect, a first request from a first client device executing a client application for initiating an electronic interactive session in the client application with one or more additional client devices can be received by at least one data processor. In aspects, the first request can be based on a first plurality of interaction templates associated with the first client device. In aspects, the first plurality of interaction templates can be associated with a respective plurality of actors. In aspects, each actor of the respective plurality of actors can be independent of remaining actors of the respective plurality of actors. In an aspect, a second request from a second client device to initiate the electronic interactive session in the client application with the one or more additional client devices can be received by the at least one data processor. In aspects, the second request can be based on a second plurality of interaction templates associated with the second client device. In aspects, the second plurality of interaction templates can be associated with a respective plurality of additional actors. In aspects, each actor of the respective plurality of additional actors can be independent of remaining actors of the respective plurality of additional actors. In an aspect, the electronic interactive session between the first client device and the second client device can be determined by the at least one data processor based on an identification of a match between one of the first plurality of interaction templates and one of the second plurality of interaction templates selected on the second client device. In aspects, the identification of the match based on a concurrent processing model enabling scaling to a plurality of servers independent of an architectural modification any of the plurality of servers. In another aspect, a client application server from a pool of pre-instantiated client application servers can be allocated by the at least one data processor for use with the client application during the electronic interactive session. In another aspect, the electronic interactive session between the first client device and the second client device in the client application can be provided by the at least one data processor.

In aspects, the first client device can be enqueued simultaneously in each of the first plurality of interaction templates and another pre-instantiated client application server can be added to the pool of pre-instantiated client application servers to replace the client application server that can be allocated. In aspects, each of the first plurality of interaction templates can be associated with a respective matchmaker instance of a plurality of matchmaker instances and the second client device can be enqueued simultaneously in each of the second plurality of interaction templates. In aspects, the respective plurality of actors and the respective plurality of additional actors can comprise behavior or logic.

In aspects, a first actor of the respective plurality of actors can be capable of a modification a state specific the first actor. In aspects, the modification can be independent of the remaining actors of the respective plurality of actors. In aspects, a second actor of the respective additional plurality of actors can be capable of an additional modification of an additional state specific to the second actor. In aspects, the additional modification can be independent of the remaining actors of the respective plurality of additional actors. In aspects, the client application server that can be allocated can be deallocated at a conclusion of the electronic interactive session. In aspects, the first plurality of interaction templates can be selected on the first client device and the second plurality of interaction templates can be selected on the second client device.

In another aspect, a system can comprise at least one data processor and memory storing instructions, which, when executed by the at least one data processor, cause the at least one data processor to perform various operations. Regarding the operations, in aspects, a first request from a first client device executing a client application for initiating an electronic interactive session in the client application with one or more additional client devices can be received. In aspects, the first request can be based on a first plurality of interaction templates associated with the first client device. In aspects, the first plurality of interaction templates can be associated with a respective plurality of actors. In aspects, each actor of the respective plurality of actors can be independent of remaining actors of the respective plurality of actors. In an aspect, a second request from a second client device to initiate the electronic interactive session in the client application with the one or more additional client devices can be received. In aspects, the second request can be based on a second plurality of interaction templates associated with the second client device. In aspects, the second plurality of interaction templates can be associated with a respective plurality of additional actors. In aspects, each actor of the respective plurality of additional actors can be independent of remaining actors of the respective plurality of additional actors. In an aspect, the electronic interactive session between the first client device and the second client device can be determined based on an identification of a match between one of the first plurality of interaction templates and one of the second plurality of interaction templates selected on the second client device. In aspects, the identification of the match based on a concurrent processing model enabling scaling to a plurality of servers independent of an architectural modification any of the plurality of servers. In another aspect, a client application server from a pool of pre-instantiated client application servers can be allocated for use with the client application during the electronic interactive session. In another aspect, the electronic interactive session between the first client device and the second client device in the client application can be provided.

In aspects, the first client device can be enqueued simultaneously in each of the first plurality of interaction templates and another pre-instantiated client application server is added to the pool of pre-instantiated client application servers to replace the client application server that is allocated. In aspects, each of the first plurality of interaction templates can be associated with a respective matchmaker instance of a plurality of matchmaker instances and the second client device can be enqueued simultaneously in each of the second plurality of interaction templates. In aspects, the respective plurality of actors and the respective plurality of additional actors can comprise behavior or logic.

In aspects, a first actor of the respective plurality of actors can be capable of a modification a state specific the first actor. In aspects, the modification can be independent of the remaining actors of the respective plurality of actors. In aspects, a second actor of the respective additional plurality of actors can be capable of an additional modification of an additional state specific to the second actor. In aspects, the additional modification can be independent of the remaining actors of the respective plurality of additional actors. In aspects, the first plurality of interaction templates can be selected on the first client device, and the second plurality of interaction templates can be selected on the second client device.

In another aspect, a non-transitory computer program product can store executable instructions, which, when executed by at least one data processor forming part of at least one computing system, can implement various operations. In aspects, regarding the operations, a first request from a first client device executing a client application for initiating an electronic interactive session in the client application with one or more additional client devices can be received. In aspects, the first request can be based on a first plurality of interaction templates associated with the first client device. In aspects, the first plurality of interaction templates can be associated with a respective plurality of actors. In aspects, each actor of the respective plurality of actors can be independent of remaining actors of the respective plurality of actors. In an aspect, a second request from a second client device to initiate the electronic interactive session in the client application with the one or more additional client devices can be received. In aspects, the second request can be based on a second plurality of interaction templates associated with the second client device. In aspects, the identification of the match based on a concurrent processing model enabling scaling to a plurality of servers independent of an architectural modification any of the plurality of servers. In aspects, the second plurality of interaction templates can be associated with a respective plurality of additional actors. In aspects, each actor of the respective plurality of additional actors can be independent of remaining actors of the respective plurality of additional actors. In an aspect, the electronic interactive session between the first client device and the second client device can be determined based on an identification of a match between one of the first plurality of interaction templates and one of the second plurality of interaction templates selected on the second client device. In another aspect, a client application server from a pool of pre-instantiated client application servers can be allocated for use with the client application during the electronic interactive session. In another aspect, the electronic interactive session between the first client device and the second client device in the client application can be provided. In aspects, the first client device can be enqueued simultaneously in each of the first plurality of interaction templates and each of the first plurality of interaction templates can be associated with a respective matchmaker instance of a plurality of matchmaker instances. In aspects, another pre-instantiated client application server can be added to the pool of pre-instantiated client application servers to replace the client application server that is allocated.

In aspects, the second client device can be enqueued simultaneously in each of the second plurality of interaction templates. In aspects, the electronic interactive session between the first client device and the second client device can be determined based on an identification of a match between one of the first plurality of interaction templates and one of the second plurality of interaction templates. In aspects, the respective plurality of actors and the respective plurality of additional actors can comprise behavior or logic. In aspects, the client application server that can be allocated can be deallocated at a conclusion of the electronic interactive session. In aspects, the first plurality of interaction templates can be selected on the first client device and the second plurality of interaction templates can be selected on the second client device.

BRIEF DESCRIPTION OF THE DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DESCRIPTION OF THE INVENTION

Figure 1:
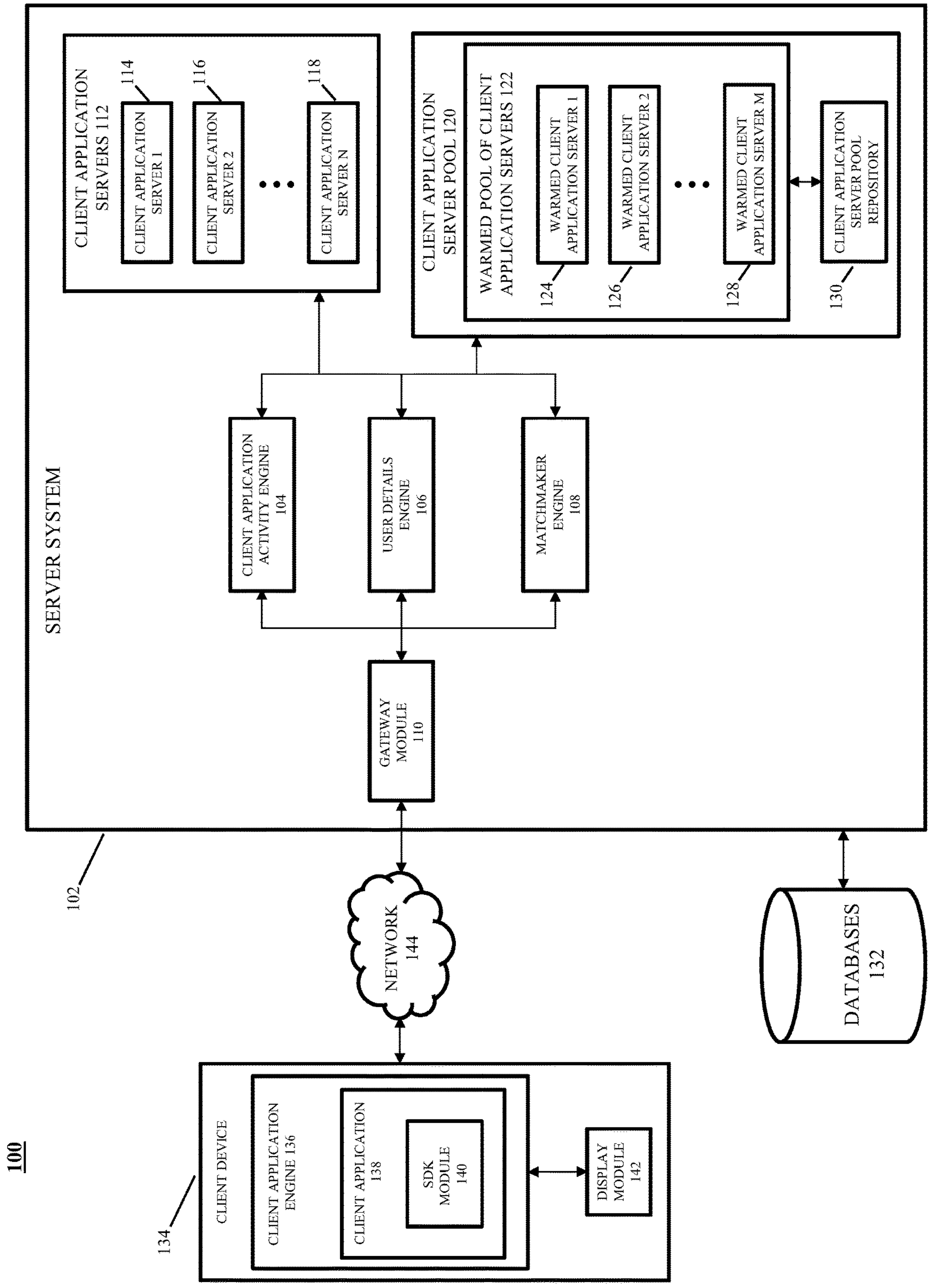
FIG. 1 is a block diagram illustrating an example system for managing interactions between users of client applications.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The present invention is directed to a system and method for managing interactions between users of client applications. According to the present invention, users of client applications (e.g., mobile applications, such as, for example, mobile games, computer games, or any other suitable type of client application) can be automatically matched with other users of those client applications to compete against or otherwise interact or engage with each other within the client application. Embodiments of the present invention can promote fair competition and other appropriate interactions in the client applications by matching users of like skill, ability, and/or other characteristics. Embodiments of the present invention can match users more quickly by allowing users to simultaneously enter queues for multiple templates with multiple interaction modes of the client application. Some implementations of the present invention can improve the efficiency and processing capabilities of computer hardware resources (e.g., computer processing and memory) to enable the identification of matches by supporting and providing substantially faster matching times, particularly for client applications with large numbers of users (e.g., hundreds of thousands, millions, tens of millions, etc. of users). For example, some implementations of the present invention can more efficiently handle large numbers of users enqueuing and identifying matches in a plurality of templates at the same time. By improving the matching speed and efficiency for client applications with large numbers of users, computer hardware resources can be freed up more quickly and used for other tasks and processes, resulting in a significant improvement in computer resource utilization.

Merely for purposes of discussion and not limitation, the present disclosure will refer to mobile games as an exemplary client application to illustrate various aspects of the present invention. However, some implementations of the present invention can be used in and with any suitable type of client application in which one or more users are automatically matched against one or more other users to engage or otherwise interact with for the purpose of achieving some goal or result within the client application. For example, the present invention can generate matches for a competition or tournament or other appropriate activity or to otherwise match users with certain characteristics with other users of the client application that have similar characteristics (e.g., to establish chat or social connections within the client application).

FIG. 1 is a block diagram illustrating an example system 100 for managing interactions between users of client applications, in accordance with embodiments of the disclosure. The system 100 can include a server system 102. The server system 102 can provide functionality for collecting and processing data associated with managing the interactions between the users of the client applications. The server system 102 can include software components, client application servers, and one or more databases that can be deployed at one or more data centers in, for example, one or more geographic locations. The server system 102 can be cloud-based (e.g., Amazon Web Services, Google Cloud, Microsoft Azure, or other suitable cloud-based infrastructure provider) or be comprised of dedicated server hardware. The software components of the server system 102 can include a client application activity engine 104, a user details engine 106, a matchmaker engine 108, a gateway module 110, client application servers 112, and a client application server pool 120. The software components can include subcomponents that can execute on the same or on different individual data processing apparatus. The software components and client application servers will be further described below.

As illustrated in FIG. 1, the server system 102 (and any of the software components and client application servers of the server system 102) can be in communication with one or more databases 132. The databases 132 can be cloud-based or reside in one or more physical storage systems. In an alternative embodiment, the server system 102 can include one or more of the databases 132. In some implementations of the present invention, the databases 132 can include any suitable information related to the software components and management of the users for the system 100, such as, for example, characteristics of users of the client applications and the interactions between those users and the client applications, such as, for example, user client application history (e.g., in the context of mobile games, which mobile games were played, number of games won in each mobile game, number of games lost in each mobile game, number of games played for each mobile game, scores in each mobile game, time played for each mobile game, win/loss percentages, etc.), user identifying information (e.g., usernames, email addresses, phone numbers, client device ID information, client device IP addresses, etc.), a history of user connections to the server system 102, user accomplishments in the client applications, user status in the client applications, user tasks in the client applications, user interactions with other users (e.g., chats, competitions, matchmaking results, etc.), user purchases in the client applications, user deposits/withdrawals in the client applications, user virtual item acquisition or usage in the client applications, other conditions in the client applications, and other like user characteristics and/or information. The databases 132 can also include, for example, information related to the client applications implemented using the system 100, such as, for example, a virtual environment for each client application, image, video, text and/or audio data for each client application, event data corresponding to previous, current or future events, client application state data defining a current state of each client application, and other like data and information.

A software application, such as, for example, a mobile game or other web-based or suitable client application, can be provided as an end-user client application to allow users to interact with the server system 102. The software application can relate to and/or provide a wide variety of functions and information, including, for example, entertainment (e.g., a game, music, videos, etc.), business (e.g., word processing, accounting, spreadsheets, etc.), news, weather, finance, sports, etc. In certain embodiments, the software application can provide a mobile game. The mobile game can be or include, for example, a sports game, an adventure game, a virtual playing card game, a virtual board game, a puzzle game, a racing game, or any other appropriate type of mobile game. In an embodiment, the mobile game can be an asynchronous competitive skill-based game, in which users can compete each against other in the mobile game, but do not have to play the mobile game at the same time. In an alternative embodiment, the mobile game can be a synchronous competitive skill-based game, in which users can play the mobile game at the same time and can compete against each other in the mobile game in real-time. Other suitable client applications are possible.

The software application or components thereof can be accessed through a network 144 (e.g., the Internet or other suitable network) by users of client devices. The server system 102 can support and be in communication with any suitable number of client devices and any appropriate number of client applications. Each client device can be any appropriate type of electronic device that is capable of executing the software application and communicating with the server system 102 through the network 144, such as, for example, a smart phone, a tablet computer, a laptop computer, a desktop or personal computer, or the like. Other client devices are possible (e.g., smart televisions, smart watches, game consoles and other like computing devices). In an alternative embodiment, the databases 132 or any portions thereof can be stored on one or more client devices. Additionally or alternatively, software components for the server system 102 (e.g., the client application activity engine 104, the user details engine 106, the matchmaker engine 108,) or any portions thereof can reside on or be used to perform operations on one or more client devices.

In an embodiment, the server system 102 can include the client application activity engine 104. The client application activity engine 104 can be configured to provide the services and the processing to allow users to participate in matches or otherwise interact in the client applications. In other words, the client application activity engine 104 can manage the interactions between users of the client applications. The client application activity engine 104 can handle creating the tournament and tournament user objects and adding those tournament users to the tournament in the databases 132, which occurs once both users have confirmed entering the tournament after being matched. The client application activity engine 104 can also handle checking if the user is allowed to enter the tournament, such as determining if the user is already in a matchmaking queue, if the user is in a paid-entry enabled location, if the user has sufficient currency to enter a paid-entry competition, and the like. The client application activity engine 104 can also pass relevant information to the matchmaker engine 108, such as, for example, user ratings, which template(s) to enqueue for, and the like.

In an embodiment, the server system 102 can include the user details engine 106 in communication with the client application activity engine 104. The user details engine 106 can be configured to provide the services for managing and retrieving user-related information (e.g., from the databases 132). The user details engine 106 can fetch client application account information for users, which can include, for example, the user ratings, account balances, and the like, which can be passed to the client application activity engine 104. Thus, in some implementations of the present invention, the matchmaker engine 108 would not need to query for any such user information, as the user information can be fetched or otherwise collected by the user details engine 106, passed to the client application activity engine 104, which can pass the user information to the matchmaker engine 108.

In an embodiment, the server system 102 can include the matchmaker engine 108 in communication with the client application activity engine 104 and the user details engine 106. The matchmaker engine 108 can be configured to perform the services for matching two or more users to electronically interact with each other in the client application. Some implementations of the present invention can be used in and with any suitable type of asynchronous or synchronous client application. In an embodiment, the client application can be an asynchronous mobile game. In an asynchronous mobile game, users do not need to play at the same time. For example, in an asynchronous mobile game, a first user can request to join a competition or tournament, which can initiate the user matching techniques of some implementations of the present invention. The first user can play the competition or tournament while some implementations of the present invention search for an appropriate match for the first user. Once a match is found, the identified second user can play the competition or tournament (if not already done so, as the first user may be joining the competition or tournament after the second user). In contrast, in a synchronous mobile game, users are required to play each other at the same time, as the users compete against each other in real-time (e.g., a pool game or the like). A synchronous mobile game should not begin until the user matching is completed. Consequently, synchronous client applications can require matching to be completed—and generally completed more quickly—before the users can interact with each other in the client application.

In an embodiment, the matchmaker engine 108 can be used for matching in synchronous client applications. Merely for purposes of discussion and not limitation, the matchmaker engine 108 can be used for synchronous mobile games, although matchmaking in any suitable type of synchronous or asynchronous client application can be supported by the matchmaker engine 108. In the example of synchronous mobile games, the matchmaker engine 108 can use a fast-matching technique that can allow users to enter a queue and select one or more templates that each user is interested in playing. A template can be a competition or tournament. A template can be comprised of template options. Template options can be characteristics of the competition or tournament that the users want to play in the synchronous mobile game, such as, for example, the type of competition (e.g., paid-entry versus non-paid-entry), an amount of a paid-entry competition (e.g., $5, $10, $20, etc.), an amount of a non-paid-entry competition (e.g., 5 virtual tokens, 10 virtual tokens, 20 virtual tokens, etc.), prize pool, the rules of the competition mode (e.g., $5 8-ball versus $5 trick shot mode in a pool game, etc.) or the like.

The matchmaker engine 108 can allow users to enter the queue for multiple templates simultaneously or substantially simultaneously, which can allow for significantly faster matching times. The matchmaker engine 108 can use a suitable expansion technique to determine the speed and order that users are entered into the queue (i.e., enqueued) for each template, as discussed in more detail below. In an embodiment, when a user selects multiple templates, they can be enqueued for each template in decreasing order from, for example, highest value to lowest value (e.g., as determined by the prize, instead of the entry fee). For instance, the matchmaker engine 108 can begin with the highest value paid-entry template, then go down through all paid-entry templates in decreasing value, followed by all of the non-paid-entry templates in descending order by value. For purposes of illustration and not limitation, a user can select the following templates: a $5 paid-entry competition, a $20 paid-entry competition, a 5 virtual token non-paid-entry competition, and a 20 virtual token non-paid-entry competition, where each of the values can represent prize values (although in an alternative embodiment, the values can represent entry fees). In this example, the user can be enqueued in the following order: the $20 paid-entry competition, then the $5 paid-entry competition, then the 20 virtual token non-paid-entry competition, and then the 5 virtual token non-paid-entry competition. As another example, a user can select templates for two $20 paid-entry competitions but with different competition modes (e.g., one for trick shot and the other for 8-ball in a pool mobile game). In such an embodiment, each competition mode can have an associated priority, which can be used to break "ties" between templates of equal value. In the present illustration for a pool game, a trick shot mode can have a higher priority of, for example, one, while the 8-ball mode can have a lower priority of, for example, two. Other priority values are possible. Consequently, the template with the higher priority (e.g., the trick shot mode with a priority of one) can be enqueued first, the template with the next highest priority (e.g., 8-ball mode with a priority of two) can be enqueued second, and so forth. Such prioritization can also be used to determine the order the competition modes can be displayed on the screen of the client device of the user (e.g., the competition mode with the highest priority can be displayed at the top or first, the competition mode with the next highest priority can be displayed below the top priority or second, etc.). When the user has not been matched for the first template in a certain amount of time, they can then be entered into the queue for the second template (e.g., while still remaining in the queue for the first template), and so on until they are matched.

In an embodiment, the matchmaking supported by the matchmaker engine 108 can be based on an actor design pattern. For example, each template can have or otherwise be associated with an actor (e.g., one actor per template). An actor design pattern is a model of concurrent computation and/or processing that treats actors as the primitive unit of computation. An actor defines some behavior or logic to execute and uses a suitable method of communication to instruct other actors to execute their behavior. The behaviors defined in an actor are asynchronous, so actors do not wait for a response. Rather, actors continue processing and receive a response at some later point in time. All communication is done through message passing, where messages are handled one at a time in the order they are received. In response to a message it receives, an actor can perform an appropriate computation or execute suitable logic, such as make local decisions, create more actors, send more messages, and determine how to respond to the next message received. Actors can modify their own private state, but can only affect each other indirectly through messaging. Actors are isolated from each other and do not share memory—the storage is "Shared-Nothing," meaning the private data is isolated and only accessible by the owning actor. Such properties allow for massive and efficient scaling of matchmaking according to some implementations of the present invention. For example, actors can support linear scaling to a plurality of servers (e.g., hundreds and thousands of servers) without requiring redesign of the architecture. Server architecture refers to various server specific characteristics, e.g., the manner in which one or more subcomponents of a server and/or a server system are connected, any protocols or processes that are implemented and initiated to communicate data within and external to the server and/or the server system, the manner in which resources (e.g., memory) are allocated and shared within the server and/or the server system, and so forth. Actors, as described in the present disclosure, can support linear scaling to a plurality of servers, which can include at least some of the above described server specific characteristics, without involving redesign or modification of at least some of these server specific characteristics. Actors can also support location transparency for ease of addressing units of computation both locally and non-locally, so that an actor can reside on any server without requiring redesign of the architecture. Actors can also support lock-free data manipulation, removing the need for lock-based synchronization. Due to the one message at a time rule, there is no need to lock data, so race conditions are prevented. An actor design pattern can be more efficient at handling a large number of users enqueuing and trying to identify matches in a plurality of templates at the same time. Other design patterns for the matchmaker engine 108 are possible.

Figure 2:
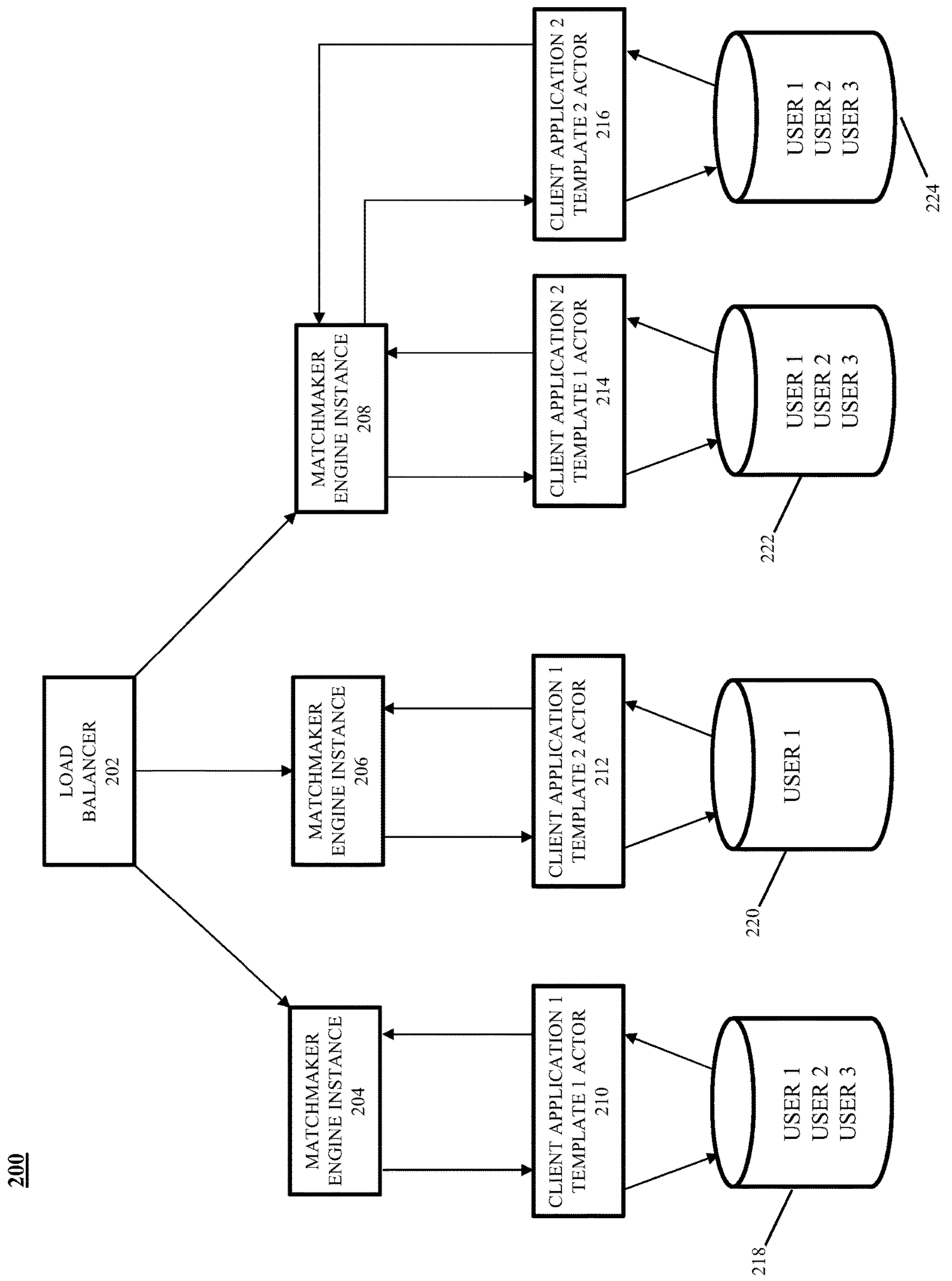
FIG. 2 is a block diagram illustrating an actor design pattern for use by a matchmaker engine for matching users of a client application.

FIG. 2 is a block diagram illustrating an actor design pattern 200 for use by the matchmaker engine 108 for matching users of a client application, in accordance with embodiments of the disclosure. A suitable load balancer 202 in the server system 102 (e.g., in the matchmaker engine 108) can allocate matchmaking among different instances or processes of the matchmaker engine 108, such as a first matchmaker engine instance 204, a second matchmaker engine instance 206, and a third matchmaker engine instance 208, although any suitable number of matchmaker engine instances can be instantiated and managed. In some implementations of the present invention, there can be one actor per client application template, which can be referred to as a Template Actor. In other words, each matchmaker engine instance can interact with each Template Actor for each client application template of any suitable number of client application templates. In an embodiment, the matchmaking queues can be ordered dictionaries in the Template Actor memory, and a Template Actor can search its queues when the queue is appended with users to search. For example, the first matchmaker engine instance 204 can use the first template actor 210 for the first template of the first client application to perform matchmaking with the three users 218. The second matchmaker engine instance 206 can use the second template actor 212 for the second template of the first client application to perform matchmaking with the single user 220. The third matchmaker engine instance 208 can use the first template actor 214 for the first template of the second client application to perform matchmaking with the three users 222, and use the second template actor 216 for the second template of the second client application to perform matchmaking with the three users 224. The users can enter the various templates simultaneously, and the respective Template Actors can perform the matchmaking concurrently or otherwise in parallel with each other. Using one client actor per client application template can support linear scaling and in-memory matching, does not require memory locking or duplicate work, and can be event driven. In other words, by using Template Actors, the matchmaker engine 108 can scale to support concurrent matchmaking for large numbers of users, such as hundreds of thousands, millions, tens of millions, or more users.

According to an embodiment, once the user is ready to be matched (e.g., by pressing a suitable virtual button displayed in the graphical interface of the client application executing on the user's client device), the matchmaker engine 108 can begin by analyzing the collection of all selected templates and progressing through the templates in, for example, descending order of value or other characteristic (e.g., descending order of paid-entry competition prize values followed by the descending order of the non-paid-entry competition prize values), regardless of client application mode. If there is a tie in the value between two competition modes with selected templates, then the higher priority template (e.g., template with priority 1, then template with priority 2, then template with priority 3, and so on) can be queued first. For purposes of illustration and not limitation, the following templates can be selected by a user for a pool game: $20 8-ball (competition mode priority 1); $20 trick shot (competition mode priority 2); $5 8-ball (competition mode priority 1); $5 trick shot (competition mode priority 2); 1 virtual token trick shot (game competition priority 1). The order of queuing to find a match can be as follows: $20 8-ball; $20 trick shot; $5 8-ball; $5 trick shot; and 1 virtual token trick shot. The matchmaker engine 108 can proceed through each selected template until an appropriate match is found. In such an embodiment, the user can remain in the queue for one or more previous templates while being enqueued for one or more additional templates to maximize the ability of the matchmaker engine 108 to identify a match. Other ways to traverse the templates in different orders and priorities by the matchmaker engine 108 to identify matches are possible.

In an embodiment, if the matchmaker engine 108 is unable to identify a match based on the selected templates, the matchmaker engine 108 can cause a prompt to be displayed to the user to play one or more different templates, such as alternative synchronous mobile game templates and/or asynchronous mobile game templates. The matchmaker engine 108 can cause to be displayed a suitable notification in the user interface to the user to prompt the user if they want to match in the different (other) template. For example, such a prompt can occur when the matchmaker engine 108 identifies no matches for the user with their selected templates (e.g., no identified matches in a predetermined amount of time), but identifies a second user with a different selected template (in the same client application, but either in the same or a different client application mode). In an embodiment, the matchmaker engine 108 can be configured for allowable fallbacks to prevent certain fallbacks from being offered to one or more users (e.g., no bot template fallbacks, no asynchronous fallbacks for synchronous templates and vice versa, and the like). Additionally or alternatively, the matchmaker engine 108 can prompt the user to add templates to their selection to increase the chances of a successful match (e.g., by adding popular templates or templates with higher user liquidity).

In an embodiment, the matchmaker engine 108 can dynamically add or remove templates when various user liquidity thresholds are met. For example, a user can be provided with a first set of a plurality of templates. The matchmaker engine 108 can obtain and maintain in real-time the number of users available to match for each template, the average wait time to match, match success rates, total queues, and other like information to determine user liquidity in real-time. Each template can have an associated user liquidity threshold associated with it. For purposes of discussion and not limitation, the user liquidity threshold can indicate, for example, the minimum number of users that the matchmaker engine 108 needs to generate a successful match for that template, although the user liquidity threshold can be based on other suitable factors or a combination of factors (e.g., available users, average wait time, etc.). The user liquidity threshold can be the same between or vary among the templates. For example, a template with a smaller paid-entry fee (e.g., $1.80) may have a higher user liquidity threshold, since more users may generally be available and have a lower average wait time for matching in tournaments with smaller paid-entry fees. However, a template with a larger paid-entry fee (e.g., $120) may have a lower user liquidity threshold, because fewer users may generally be available and have a longer average wait time for matching in tournaments with larger paid-entry fees. In a set of templates, the matchmaker engine 108 can remove a template from the set displayed or otherwise presented to the user when the user liquidity falls below the user liquidity threshold for that template. The matchmaker engine 108 can add a template to the set displayed or otherwise presented to the user when the user liquidity rises above the user liquidity threshold for that template. With such dynamic template scaling, the user can be presented (continuously or at predetermined intervals) with an updated set of templates that can maximize the chances of a successful match. Additionally or alternatively, each template can be associated with one or more times or time ranges, so that the matchmaker engine 108 can add to or remove from each set certain templates for the user at predetermined times or within the predetermined time ranges.

In an embodiment, the matchmaker engine 108 can dynamically modify the user matching for each or any templates based on user liquidity thresholds. For example, as user liquidity increases above a predetermined threshold (or is within a predetermined threshold range), the matchmaker engine 108 can provide tighter matching for each or any templates, since there may be more users available for matching. Conversely, as user liquidity decreases below the predetermined threshold (or is outside the predetermined threshold range), the matchmaker engine 108 can provide wider matching for each or any templates, since there may be fewer users available for matching. The matchmaker engine 108 can provide tighter or wider matching by suitably updating the parameters that are used on, for example, the Elo expansion so that it can take more or less time to expand to a wider or tighter maximum range of Elo difference between two users where the matchmaker engine 108 would allow them to match to one another. In such a manner, the matchmaker engine 108 can respond to user liquidity in real-time to maximize the probability of successfully matching users. Additionally or alternatively, the matchmaker engine 108 can dynamically modify the user matching for each or any templates based on the time of day or other suitable parameters, such that the matchmaker engine 108 can modify user matching at predetermined times or within the predetermined time ranges. Additionally or alternatively, a suitable machine learning/artificial intelligence techniques can be used by the matchmaker engine 108 to match users. For example, a machine learning model can be trained based on user liquidity data for each or any templates to optimize, for example, the time to successful match. The machine learning model can then be used to dynamically match users for each or any of the templates. The machine learning model can be updated or otherwise adapted as user liquidity changes over time.

In an embodiment, to improve or otherwise boost user liquidity for one or more templates, the matchmaker engine 108 can cause to be displayed in the user interface of the client application a suitable modal or other notification to prompt users to play certain synchronous client applications or certain modes in those synchronous client applications. Additionally or alternatively, the matchmaker engine 108 can display or cause to be displayed a chat message in a chat user interface to prompt users to play certain synchronous client applications or certain modes in those synchronous client applications. Such prompts can be displayed automatically at the instruction of the matchmaker engine 108 when user liquidity levels (either generally for the client application or for one or more templates) fall below suitable user liquidity thresholds. The user prompts can continue until the user liquidity levels are greater than or equal to the user liquidity thresholds, for a predetermined time interval, or the like. Additionally or alternatively, the matchmaker engine 108 can cause the display of such prompts in the client application at predetermined times or within predetermined time ranges.

In some implementations of the present invention, the speed at which the user is enqueued into each template can be determined by a suitable expansion technique. In one embodiment, the expansion technique used by the matchmaker engine 108 can be a linear algorithm, such as in Equation (1):

$$Y = mX + b \tag{1}$$

In Equation (1), the variable Y can be the total time since entering the first queue, the variable X can be the expansion index starting from 0, the constant b can be a first time interval (e.g., in seconds) for how long the matchmaker engine 108 waits before entering the second selected template, and the constant m can be a second time interval (e.g., in seconds) for how long the matchmaker engine 108 waits before moving from the second selected template to the third selected template, from the third selected template to the fourth selected template, and so forth.

According to embodiments, the variable X can represent how many additional queues have been entered since the first queue. When X=0, the user is in one queue and waits Y(0) until entering the next queue. When X=1, the user is in two total queues and waits Y(1) time to enter the third queue. Y(1)−Y(0) time passes between entering the second and third queues. For purposes of illustration and not limitation with m=1 and b=1 (i.e., Y=x+1), a user can select the templates discussed above. For purposes of illustration and not limitation, a user can select the following templates: a $5 paid-entry competition, a $20 paid-entry competition, a 5 virtual token non-paid-entry competition, and a 20 virtual token non-paid-entry competition. In this example, the user can be enqueued in the following order: the $20 paid-entry competition, then the $5 paid-entry competition, then the 20 virtual token non-paid-entry competition, and then the 5 virtual token non-paid-entry competition. Using Equation (1) for the matchmaker engine 108, the user immediately enters a queue for the $20 paid-entry competition. After one second (Y=1*0+1=1), the user enters a queue for the $5 paid-entry competition. After an additional one second (two seconds total, i.e., Y=1*1+1=2), the user enters a queue for the 20 virtual token non-paid-entry competition. After an additional one second (three seconds total, i.e., Y=1*2+1=3), the user enters a queue for the 5 virtual token non-paid entry competition. According to an alternative embodiment, both m and b can be set to zero to allow the user to enter all queues simultaneously.

In another embodiment, the expansion technique used by the matchmaker engine 108 can be a logarithmic algorithm, such as Equation (2):

$$Y = \ln(mX + b) + c \tag{2}$$

In Equation (2), the definitions of the variables and parameters are similar to those discussed with respect to Equation (1), where the constant c can be a third time interval (e.g., in seconds) to control how fast the logarithmic algorithm expands to subsequent templates. Thus, the logarithmic algorithm of Equation (2) can expand slowly to the second template and then quickly expand to all other templates. For purposes of illustration and not limitation, let m=1, b=1, and c=5 (i.e., Y=ln(X+1)+5) and a user selects the templates discussed above. The user is immediately queued into the first template. The user is enqueued for the second template after Y=ln(1*0+1)+5=5 seconds. The user then enters the third queue after Y=ln(1*1+1)+5=~5.7 seconds. The user enters the fourth queue after Y=ln(2*1+1)+5=~6.1 seconds.

In another embodiment, the expansion technique used by the matchmaker engine 108 can be an exponential algorithm, such as in Equation (3):

$$Y = e^\wedge(mX + b) + c \tag{3}$$

In Equation (3), the definitions of the variables and parameters are similar to those discussed with respect to Equation (2). Thus, the exponential algorithm can expand quickly to the second and then slowly to all other templates. For purposes of illustration and not limitation, let m=1, b=1, and c=5 (i.e., Y–e^ (X+1)+5) and a user selects the templates discussed above. The user is immediately queued into the first template. The user is enqueued for the second template after Y=e\(1*0+1)+5=~7.7 seconds. The user then enters the third queue after Y=e^ (1*1+1)+5=~12.4 seconds. The user enters the fourth queue after Y=e^ (2*1+1)+5=~25.1 seconds.

In some embodiments, the constants m, b, and c can be customizable and can differ between each expansion technique. The expansion techniques can be set, for example, on a per-client application basis, on a per-template-group basis, specific to an individual template ID, at an entry type level (e.g., paid-entry or non-paid-entry), or the like. For example, one expansion technique can be used for a first client application, while another expansion technique can be used for a second client application, and so on. According to an embodiment, different expansion techniques can be applied by the matchmaker engine 108 configuration for a client application at different times of the day. For example, the linear expansion algorithm can be used from 6 am to 6 pm, the logarithmic expansion algorithm can be used from 6 pm to 12 am, and the exponential algorithm can be used from 12 am to 6 am. Other expansion techniques in other orders and times are possible. Additionally or alternatively, the variables and parameters for each of the expansion techniques can be modified based on, for example, the time of day and/or date. For example, the matchmaker engine 108 can modify the variables and parameters to provide tighter matching during peak hours (and/or during holidays or weekends when more users may be available for matching), while matchmaker engine 108 can modify the variables and parameters to provide wider matching during off-hours (and/or non-holidays or weekdays when fewer users may be available for matching).

According to an embodiment, the matchmaker engine 108 can additionally or alternatively use an Elo rating expansion technique for synchronous client applications. Additionally or alternatively, the Elo rating expansion technique can be used for asynchronous client applications. Such an expansion technique can determine how quickly a user's possible rating band for matching expands. In an embodiment, the matchmaker engine 108 can use an exponential rating expansion algorithm, such as in Equation (4):

$$Y = \min(a + b * e^{\wedge}(X/c), d) \tag{4}$$

In Equation (4), the variable Y is the rating difference, the variable X is how long to wait before matching, constant a is the minimum rating for instant matching, constants b and c are scaling coefficients, and constant d' is the maximum rating difference. In an embodiment, the values of a, b, c, and d can be adjusted based on, for example, a template or template type (e.g., paid-entry competitions versus non-paid-entry competitions) basis. In an embodiment, the such an expansion technique can be used by the matchmaker engine 108 for event-based expansion. For example, when a user enters a queue, the matchmaker engine 108 can loop through all users in the queue and schedule "messages" to match in a predetermined number of seconds based on the rating difference. If a user has already been matched with another user by the time their message is processed, then further matching is not necessary. In such an embodiment, because matching is event-based, when a user enters the queue, the matching performed by the matchmaker engine 108 should be reciprocal in rating difference. For purposes of illustration and not limitation, let a first user have an Elo rating of 1200. The first user requests a synchronous competition and enters a queue. Waiting in the queue are the following three users: a second user having an Elo rating of 400; a third user having an Elo rating of 1400; and a fourth user having an Elo rating of 1500. In the present illustration, let a=200, b=2, c=2, and d=800 for Equation (4). Therefore, the matchmaker engine 108 can immediately match the first user with any user below a 200 rating difference, which would expand to 800 points over 10 seconds (and can be capped at 800 if d=800, otherwise d would need to be modified). In the present illustration, the matchmaker engine 108 can immediately match the first user with the third user, because their rating difference is 200 and a=200, while it would take the matchmaker engine 108 approximately 7 seconds to match the first user with the fourth user (with a rating difference of 300), and approximately 12 seconds to match the first user with the second user (with a rating difference of 800).

Additional or alternative expansion techniques can be used by the matchmaker engine 108. For example, the matchmaker engine 108 can use a variant of the logarithmic algorithm, such as in Equation (5):

$$Y = c * \log((\text{rating\_delta} - m)/b) \tag{5}$$

In Equation (5), the definitions of the variables and parameters are similar to those discussed with respect to the previous equations, where rating_delta is the rating difference. Other expansion algorithms are possible.

In an embodiment, the matchmaker engine 108 can dynamically adjust the expansion algorithm parameters. For example, the expansion algorithm parameters can be dynamically adjusted based on real-time user liquidity. A predetermined user liquidity threshold can be used by the matchmaker engine 108 to determine when the expansion algorithm parameters can be adjusted. For example, when user liquidity is below the predetermined user liquidity threshold, the matchmaker engine 108 can adjust the expansion algorithm parameters to provide wider matching (e.g., by increasing the maximum rating difference), since there may be fewer users available for matching. Alternatively, when the user liquidity is above the predetermined user liquidity threshold, the matchmaker engine 108 can adjust the expansion algorithm parameters to provide tighter matching (e.g., by decreasing the maximum rating difference), since there may be more users available for matching. Additionally or alternatively, the matchmaker engine 108 can modify the expansion algorithm parameters based on, for example, the time of day and/or date. For example, the matchmaker engine 108 can modify the expansion algorithm parameters to provide tighter matching during peak hours (and/or holidays or weekends), while the matchmaker engine 108 can modify the expansion algorithm parameters to provide wider matching during off-hours (and/or nonholiday days or weekdays).

Additionally or alternatively, the matchmaker engine 108 can adjust the expansion algorithm parameters so that Elo ratings can expand asymmetrically. In such an embodiment, the matchmaker engine 108 can use different upwards and downwards Elo expansions to expand more quickly in one direction than the other. Accordingly, the matchmaker engine 108 can use different expansion algorithm parameters for upward and downward expansion. For purposes of illustration and not limitation, downward expansion algorithm parameters can provide for faster expansion than the upward expansion algorithm parameters. In the present illustration, a first available opponent can be 100 Elo below a user, while a second available opponent can be 75 Elo above the user. In the present illustration, a match with the first available opponent can be made by the matchmaker engine 108 due to asymmetric expansion since the downward expansion is faster, even though the first available opponent is further away from the user. Such asymmetric matching can be bucket- or cohort-based, such that users can be matched with opponents in the same bucket, group, or cohort of users. If no matches are found within the bucket or cohort within a predetermined amount of time, the matchmaker engine 108 can expand matching to opponents in different buckets.

In some implementations of the present invention, the matchmaker engine 108 can use the fast-matching technique in conjunction with the Elo rating expansion technique to perform matching in, for example, synchronous client applications, although fast-matching technique in conjunction with the Elo rating expansion technique can be used for asynchronous client applications. As discussed previously, the matchmaker engine 108 can allow users to enter the queue for multiple templates at once or otherwise simultaneously (or nearly simultaneously). When a user selects multiple templates, they can be enqueued for each template in, for example, decreasing order (e.g., by value). As the user enters each queue, the matchmaker engine 108 can use the Elo rating expansion technique to match that user with other users waiting in the respective queue. For purposes of illustration and not limitation, a user can be enqueued by the matchmaker engine 108 in the following order: a \$20 paid-entry competition, then a \$5 paid-entry competition, then a 20 virtual token non-paid-entry competition, and then a 5 virtual token non-paid-entry competition. The user would immediately enter the queue for the $20 paid-entry competition, which initiates the Elo rating expansion technique for a $20 paid-entry competition. After one second (e.g., using the linear algorithm of Equation (1) with m=1 and b=1), the user can enter a queue for the $5 paid-entry competition, which initiates the Elo rating expansion technique for a $5 paid-entry competition. After an additional one second (2 seconds total), the user can enter a queue for the 20 virtual token non-paid-entry competition, which initiates the Elo rating expansion technique for a 20 virtual token competition. After an additional one second (three seconds total), the user can enter a queue for the 5 virtual token non-paid entry competition, which initiates the Elo rating expansion technique for a 5 virtual token competition. As discussed previously, the user can remain in the queue for one or more previous templates while being enqueued for one or more additional templates to maximize the ability of the matchmaker engine 108 to identify a match. However, the matchmaker engine 108 can use either or both of the fast-matching technique and the Elo rating expansion technique individually or collectively to achieve a preferred matching in the shortest time possible.

In some implementations of the present invention, the matchmaker engine 108 can classify or otherwise organize users into cohorts, groups, or buckets based on any suitable characteristics of those users. For purposes of illustration and not limitation in the context of synchronous mobile games, such user characteristics can include, for example, skill rating, the total number of games played, the total number of games won, the number of synchronous games played, the number of synchronous games won, and the like, or any combination thereof. Other user characteristics and other types of client applications are possible. For example, users who are "new" and have played less than a predetermined number of games can be classified into a first bucket. Other "experienced" users can be classified into buckets according to, for example, their skill rating for the mobile game, where each bucket can have a corresponding skill band. Additionally or alternatively, experienced users can be classified into buckets according to the number of games played, the number of games won, where each bucket can have a corresponding number of games played, number of games won, etc. or any combination thereof. Other characteristics for buckets are possible. Any suitable number of such buckets can be used by the matchmaker engine 108 and each bucket can be associated with any appropriate characteristic of the client application. According to an embodiment of the present invention, users can be matched with other users in the same bucket. However, in some implementations of the present invention, users in a bucket associated with a first characteristic can be matched with users in another bucket associated with a second characteristic if, for example, the second characteristic is within a predetermined difference or range of the first characteristic. Additionally or alternatively, matching within a user's bucket can continue for a predetermined amount of time before matching expands to other user buckets. In other words, in intra-bucket matching, the matching population for a user can be limited to the user's bucket for a first predetermined amount time (e.g., seconds). If the user is not matched within that amount of time, the matching can be expanded to include users from other buckets (i.e., inter-bucket matching), such as, for example, those who have expanded past their respective time windows. Additionally or alternatively, each bucket can be associated with a different parameters for the Elo rating expansion technique used by the matchmaker engine 108. In other words, the matchmaker engine 108 can assign or otherwise associate different variables and parameters used for the Elo rating expansion technique for each or any bucket, and each set of variables and parameters can be appropriately modified by the matchmaker engine 108, such as dynamically (e.g., based on real-time user liquidity), based on the time of day, or the like.

As illustrated in FIG. 1, the server system 102 can include a gateway module 110. The gateway module 110 can be configured to support communications between the server system 102 and the one or more client devices 134. The gateway module 110 can support any suitable type of communication protocol for transmitting data and information from and to the server system 102, through the network 144, and to and from the one more client devices 134, respectively. For example, the gateway module 110 can support standard internet protocols (TCP/IP), can comprise a suitable data and signaling channel, such as a gRPC gateway or the like, support OpenGL or other suitable technologies, or comprise any other appropriate form of communication channel, whether wired or wireless. In some implementations of the present invention, the gateway module 110 can additionally or alternatively comprise a TURN (Traversal Using Relay NAT) server or the like (e.g., a STUN (Session Traversal Utilities for NAT) server) to support communication of video/audio data between the server system 102 and the client devices 134. Additionally or alternatively, the gateway module 110 can comprise a suitable encoder to encode video to, for example, h.264 or VP8 for WebRTC or the like. However, other suitable server communication protocols, encoding techniques, and/or transmission protocols for use in and with the gateway module 110 are possible.

In an embodiment, the system 100 can include one or more client devices 134 in communication with the server system 102 via the gateway module 110. According to embodiments, the client device 134 can be any suitable type of device that is capable of running an appropriate client application through which a user can interact with other users, such as, for example, a smartphone, a tablet, a laptop, a desktop computer, a game console, a smart television, a smart watch, or any other appropriate device. In embodiments, the server system 102 can support any suitable number of client devices 134.

In an embodiment, the client devices 134 can include a client application engine 136 in communication with a display module 142. The client application engine 136 can support execution of a client application 138 installed on the client device 134. The client application 138 can include an SDK (Software Development Kit) module 140 that can be integrated into the client application 138. The SDK module 140 can provide the features, functionality, and other capabilities for the client application 138 to support interaction with the server system 102, including matchmaking, managing competitions or other interactions between users, and the like. For purposes of illustration and not limitation, where the client application 138 is a skill-based single-player mobile game, the SDK module 140 can allow a developer to integrate a tournament-enabled wagering platform into a single-player mobile game to convert the single-player mobile game into a competitive eSports mobile game. The display module 142 can support the display of video and/or audio information from the client application 138 to the user. In some implementations of the present invention, the display module 142 can accept input from the user (e.g., touch inputs) to allow the user to interact with and control the client application 138.

In some implementations of the present invention, the matchmaker engine 108 can be a clustered Elixir application or the like that makes use of, for example, the Horde actor library (or other appropriate library) for distributing processes around a cluster of client application servers. The matchmaker engine 108 can also use, for example, Mnesia or the like for configuration storage. Elixir is a functional language that sits on top of an Erlang virtual machine and can be used for providing low-latency, distributed, and fault-tolerant systems. Horde is a distributed supervisor and registry that can provide for implementation of an actor model across remote matchmaker nodes. Mnesia is a distributed database that is natively associated with Erlang, and, therefore, is compatible with Elixir. For example, Mnesia can be used to store search configurations (e.g., for the fast-matching technique and/or the Elo rating expansion technique), a hash ring (discussed in more detail below), pending matches, and other like information.

In some implementations of the present invention, the server system 102 can include a plurality of client application servers 112 for use by and with the client applications executing on the client devices 134 of the users. The plurality of client application servers 112 can be in communication with one or more of the client application activity engine 104, the user details engine 106, and the matchmaker engine 108. Additionally or alternatively, some or all of the plurality of client application servers 112 can be remote to and in communication with the server system 102. The plurality of client application servers 112 can include any suitable number of client application servers, such as a first client application server 114, a second client application server 116, . . . , and an Nth client application server 118, where N can be any appropriate natural number. In an embodiment, each of the plurality of client application servers 112 can be allocated or otherwise assigned to support a client application during or upon matchmaking by the matchmaker engine 108. In some implementations of the present invention, the plurality of client application servers 112 can be configured as, for example, a hash ring. A hash ring can take the leading bits of the hash value of an item (e.g., a match identification (ID)) and use this information to determine to which node the item should be assigned. For example, nodes on the hash ring can be broken into shards, and each shard can be assigned an integer value in an appropriate keyspace, which can be the set of integers from 1 to a predetermined number (e.g., 232-1 or the like). The distribution of these shards can be random, but deterministic. Keys can then be mapped to a shard by converting the key to a binary, hashing it with an appropriate hashing algorithm (e.g., SHA-256 or the like), converting the hash to an integer in the keyspace, and then locating the shard that is assigned the next highest value. If there is no next highest value, the lowest integer can be used, which is how the "ring" can be formed.

In some implementations of the present invention, the hash ring can be managed, in which the hash ring can be held in the internal state of a process maintained by, for example, the matchmaker engine 108. A hash ring can be static or dynamic. Static hash rings are those where nodes are provided up front, and nodes can be manually added/remove at runtime. Dynamic hash rings can be monitored (e.g., by the matchmaker engine 108, such as by using Erlang node monitoring or the like), and nodes on the hash ring can be automatically added or removed based on cluster membership (e.g., Erlang cluster membership). Thus, the hash ring can be used to store the available client application servers 112 and ensure that two users having the same match ID can connect to the same client application servers 112, while evenly distributing matches over the available client application servers 112. In an embodiment, the matchmaker engine 108 can query the plurality of client application servers 112 on a periodic basis (e.g., every 5 seconds, 10 seconds, 30 seconds, or the like) to maintain a list of available client application servers 112. When the SDK modules 140 of the respective client devices 134 of the users are polling the server system 102 for the match to start, the matchmaker engine 108 can fetch an IP address and port number (or other suitable address information) from the hash ring based on, for example, a hash of the match ID for the two users to ensure that both users are sent to and using the same client application servers 112 for the match, competition, or tournament in the client application. The fetched client application server 112 can then be used by both users for the duration of the match in the client application 138 executing on the respective client devices 134.

Additionally or alternatively, in some implementations of the present invention, the server system 102 can include a client application server pool 120 for use by and with the client application 138 executing on the client devices 134 of the users. The client application server pool 120 can be in communication with one or more of the client application activity engine 104, the user details engine 106, and the matchmaker engine 108. Additionally or alternatively, some or all of the client application server pool 120 can be remote to and in communication with the server system 102. The client application server pool 120 can include a "warmed" pool of client application servers 122. For example, each of the client application servers in the warmed pool of client application servers 122 can be pre-allocated and pre-instantiated within the pool. By spinning up the client application servers in the pool in the background and maintaining those spun-up client application servers in the warmed pool, a client application server can be immediately (or nearly immediately) assigned to a match, competition, or tournament upon request with little or no concomitant delay. The warmed pool of client application servers 122 can include any suitable number of warmed client application servers, such as a first warmed client application server 124, a second warmed client application server 126, . . . , and an Mth warmed client application server 128, where M can be any appropriate natural number. It is noted that M (of the warmed pool of client application servers 122) and N (of the client application servers 112) can be the same or different numbers.

Once a warmed client application server has been assigned and allocated to a match, competition, or tournament, the assigned warmed client application server can be immediately (or nearly immediately) replaced in the warmed pool of client application servers 122 by another warmed client application server that is spun up from a client application server pool repository 130 that is in communication with the warmed pool of client application servers 122. Such as replacement client application server can then be ready for immediate (or nearly immediate) assignment and allocation to another match. In such a manner, client application servers from the warmed pool of client application servers 122 can be allocated to users in real-time. In the present disclosure, "real-time" can refer to processing that can occur instantaneously or within a short period of time (e.g., a few seconds) so that there are minimal delays between when the request is received and when the request is processed and the response provided. The computing resources allocated to a client application server for a match, competition, or tournament can be deleted or otherwise deallocated immediately (or nearly immediately) once the match, competition, or tournament ends and the client application server is no longer needed for that match, competition, or tournament. In some implementations of the present invention, such freed up computing resources can be re-allocated by, for example, the matchmaker engine 108 to add and warm another client application server to the warmed pool of client application servers 122, rather than maintaining resources for an allocated client application server that is no longer needed for a concluded match, competition, or tournament. Thus, in an embodiment, the matchmaker engine 108 can request the client application server pool 120 to allocate a client application server from the warmed pool of client application servers 122 in response to a request from users to enter a match. The client application server pool 120 can return one of the client application servers from the warmed pool of client application servers 122, such as an IP address and port number (or other suitable address information) of a warmed client application server, to ensure that both users are sent to and using the same (warmed) client application server for the match, competition, or tournament. Concurrently, the client application server pool 120 can spin up a replacement client application server from the client application server pool repository 130 and add it to the warmed pool of client application servers 122. The client application server can be allocated per match, competition, or tournament and destroyed or otherwise deallocated when the match, competition, or tournament is complete. In some implementations of the present invention, the client application server pool 120 can use the Agones open-source platform for deploying, scaling, and orchestrating dedicated ephemeral game servers for large-scale multiuser games. However, other server platforms are possible.

The size of the warmed pool of client application servers 122 can be fixed or dynamic. For example, the size of the warmed pool of client application servers 122 can be fixed such that a predetermined pool size number of warmed client application servers can be maintained in the pool. As client application servers in the warmed pool of client application servers 122 are allocated, the client application server pool 120 can replace the allocated client application server with another warmed client application server to maintain the size of the warmed pool of client application servers 122 at (or around) the predetermined pool size number. The predetermined pool size number can be based on, for example, usage trends or other historical matching information and the like. Accordingly, high usage (and a greater number of matches) can have or be associated with a greater predetermined pool size number while lower usage (and a lower number of matches) can have a smaller predetermined pool size number.

Additionally or alternatively, the size of the warmed pool of client application servers 122 can be dynamic. In some implementations of the present invention, client application server pool 120 in conjunction with, for example, the matchmaker engine 108 can monitor in real-time the usage trends of the client applications. For example, as usage trends increase, the client application server pool 120 in conjunction with, for example, the matchmaker engine 108 can increase the size of the warmed pool of client application servers 122 to accommodate the greater usage so that client application server allocation can continue in real-time without added delay. Conversely, as usage trends decrease, the client application server pool 120 in conjunction with, for example, the matchmaker engine 108 can decrease the size of the warmed pool of client application servers 122 to accommodate the lower usage so that computing resources are not unnecessarily overused and can be allocated elsewhere. In such an embodiment, the size of the warmed pool of client application servers 122 can be dynamically altered to accommodate periods of increased use (e.g., spikes in usage) as well as lulls in usage to maintain real-time client application server allocation. In some implementations of the present invention, the matchmaker engine 108 can include a suitable predictive model or use appropriate machine learning/artificial intelligence techniques to determine the size of the warmed pool of client application servers 122. For example, a machine learning model can be trained based on usage trend data for client applications to minimize the amount of time to allocate a client application server and maintain a reduced allocation time for the real-time client application server allocation. The machine learning model can then be used to dynamically and appropriately modify the size of the warmed pool of client application servers 122 based on the usage at a particular time. The machine learning model can be updated or otherwise adapted as the usage trends for client applications change and evolve over time, as monitored by, for example, the matchmaker engine 108. In some implementations of the present invention, the size of the warmed pool of client application servers 122 can be fixed at certain times and dynamic at other times. For example, for periods of time that experience lower usage, the size of the warmed pool of client application servers 122 can be fixed. However, during (e.g., intermittent) periods of higher usage (e.g., usage spikes), the size of the warmed pool of client application servers 122 can be dynamic. The matchmaker engine 108 can switch the size of the warmed pool of client application servers 122 back to fixed once the period of higher usage ends. In this way, the client application server pool 120 can adapt to changing usage conditions as necessary to maintain a reduced allocation time for the real-time allocation of client application servers.

In some implementations of the present invention, the matchmaker engine 108 can use HTTP long polling ("long polling") for the matchmaking process. Long polling is a technique for maintaining persistent connections with the server system 102. Long polling can be used to push information to a client device 134 as soon as possible from the server system 102—the server system 102 can send data independently or push data to the client device 134 without the client device 134 making a request, such that the information is pushed as it becomes available. As a result, the server system 102 does not have to wait for the client device 134 to send a request. The server system 102 does not close the connection to the client device 134 once the server system 102 receives a request from the client device 134. Instead, the server system 102 responds only if a new message is available or if a timeout threshold is reached. Only when a message is delivered from the server system 102, the connection is closed and reestablished. Thus, once the client device 134 receives a response, it immediately sends a new request to the server system 102 to have a new pending connection to send data to the client device 134, and the operation is repeated. With such an approach, the server system 102 can emulate a real-time server push feature. The matchmaker engine 108 can use long polling to perform various functions, including enqueue (e.g., enter the matching process on a selection of templates), dequeue (e.g., leave the matching process on all templates), get match (e.g., polling endpoint to ask the matching process if a match has been found), confirm (e.g., a user selecting a "confirm" or "play" button indicating the user is ready to start the match), and check start (e.g., polling endpoint to ask the matching process if a tournament has been created, and, if so, fetch the connection information to the client application server). Other functions are possible. As discussed previously, the matching itself can be event-based and can be performed in-memory (using actors) via an ordered dictionary per template.

Figure 3:
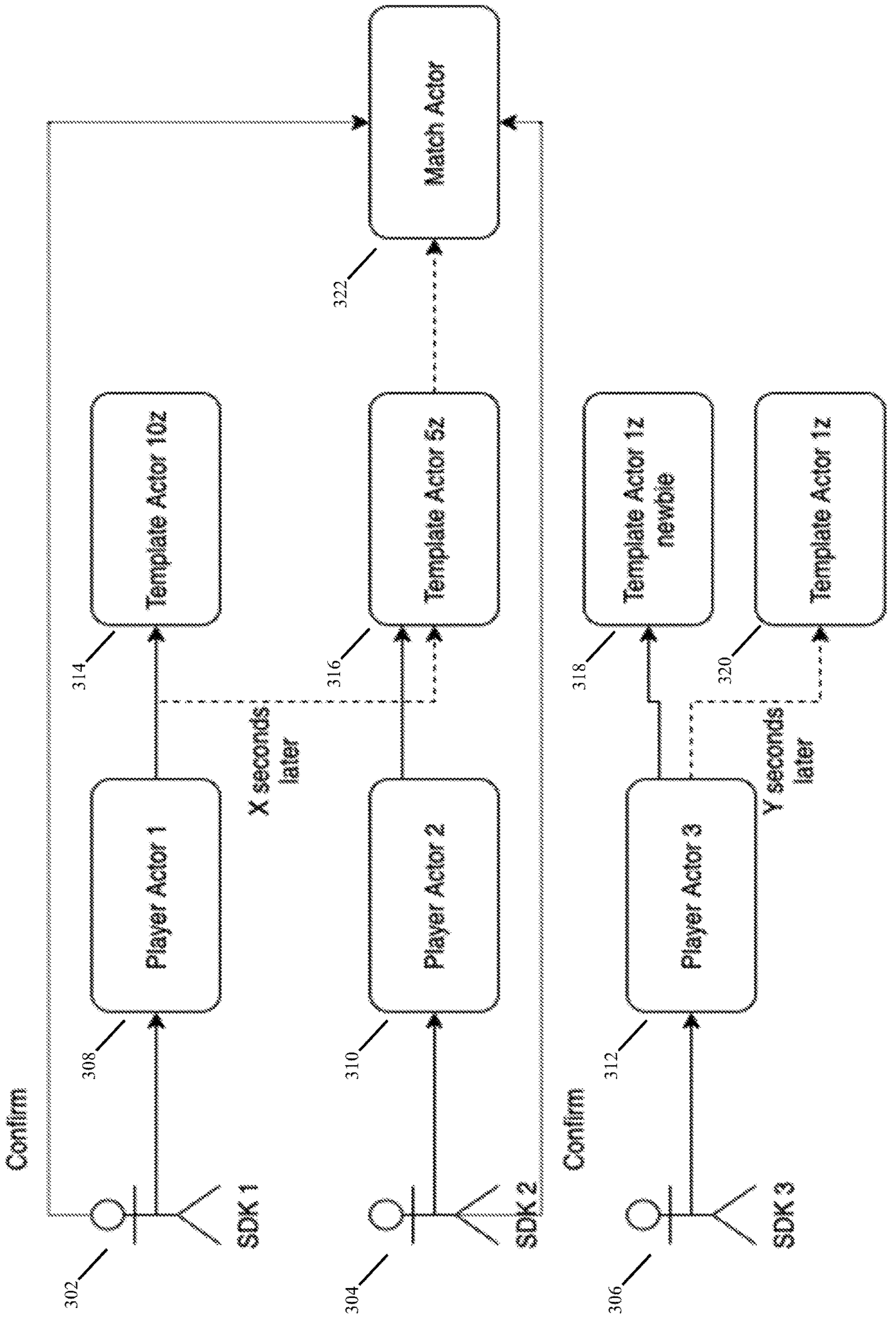
FIG. 3 is a block diagram illustrating an example of matchmaking for users of a client application as performed by the matchmaker engine using actor design patterns.

FIG. 3 is a block diagram illustrating an example 300 of matchmaking for users of a client application as performed by the matchmaker engine 108 using actor design patterns, in accordance with embodiments of the disclosure. In an embodiment, the matchmaker engine 108 can interact with the client application activity engine 104 and the user details engine 106 to support the matchmaker enqueue process. To start the matchmaker enqueue process, a user 302 (e.g., the enqueue process applies to user 304 and user 306 as well) can select a list of templates in the user interface of the client application 138 executing on the client device 134 of the user 302. The SDK module 140 can send a request to the server system 102. The request can include, for example, the user ID, the list of template IDs, the device ID of the client device 134, and whether or not the match is a bot match. Additional or alternative information in the request is possible. The gateway module 110 can accept the request and create a request context that can be forwarded to the client application activity engine 104. The client application activity engine 104 can fetch information from the user details engine 106 to validate that the user 302 is allowed to join each selected template. Such information can be used to determine, for example, if the user 302 is in a paid-entry enabled location, if the user 302 is registered, if the user 302 has enough currency (e.g., to enter paid-entry competitions), and the like. The client application activity engine 104 can sort the list of template IDs by, for example, type and value, such as from high to low for paid-entry competition templates followed by high to low for non-paid-entry competition templates, although other methods of sorting the list of template IDs are possible. The client application activity engine 104 can write or otherwise store the enqueue event into the databases 132. The client application activity engine 104 can also fetch user quarantine information from the user details engine 106. The client application activity engine 104 can build a suitable match data object containing, for example, the sorted template list, the user ID, user ratings, total competitions (e.g., games) played, SDK version, whether it is a bot match, the client application ID, the client device platform, whether the user is quarantined, a list of blacklisted users, and the client application version. Other information for match data object is possible. The match data object can be passed to the matchmaker engine 108. The matchmaker engine 108 can fetch additional details from other services (e.g., a user statistics service or the like), if desired, such as the number of synchronous competitions played, the number of synchronous competitions won, etc. At this stage, the matchmaker engine 108 has all the data necessary to find a match. The matchmaker engine 108 can create a Player Actor 308, begin the matching process (e.g., using the fast-matching technique) asynchronously, and can respond with an empty enqueue response. After the client application activity engine 104 receives the empty enqueue response from the matchmaker engine 108, the client application activity engine 104 can request an estimated wait time and return the estimated wait time to the gateway module 110. The gateway module 110 can respond to the SDK module 140 on the client device 134 with the estimated wait time as a response to display to the user 302 via the display module 142.

Once the matchmaker engine 108 has all the data necessary to find a match, the matchmaker engine 108 can check if a Player Actor already exists for the user ID and client application ID. If so, the matchmaker engine 108 can return an appropriate error message (e.g., for display to the user via the display module 142 on the client device 134) to ensure that the user 302 is only in the queue of a client application a single time. Otherwise, the matchmaker engine 108 can create the Player Actor 308 addressable by the user ID and the client application ID and send an "enter matchmaker" message to it. When the Player Actor 308 is created, an initialization function in the Player Actor 308 can begin sending heartbeat messages (at a configurable interval) to itself to determine if the user 302 is still in the queue. If the user 302 does not reach the "Get Match" polling endpoint for an entire timeout interval, the Player Actor 308 can terminate. The initialization function can also configure the maximum lifetime of the Player Actor 308 and set up appropriate cleanup functions that can be run when the Player Actor 308 is terminated. When the Player Actor 308 handles the enter matchmaker message, it can send an SQS (Simple Queue Service) message or the like to record the event, can send an enqueue message to itself with the first template in the list, and can schedule an expand message for the next template (e.g., the template associated with Template Actor 316) with a suitable delay based on the expansion technique (e.g., Equation (5) or other expansion technique). When the Player Actor 308 handles the enqueue message, it can send an enqueue message to a Template Actor 314 specified in the message. When the Player Actor 308 handles the expand message, it can send an enqueue message to the specified Template Actor 314, can increment the expansion index, and can schedule another expand message to the next template (e.g., the template associated with the Template Actor 316) based on the expansion technique (e.g., Equation (5) or other expansion technique).

In an embodiment, Template Actors can be long-living actors that can represent a queue per template and can handle the bulk of the matching logic, as discussed above. When the Template Actor 314 handles the enqueue message, it can store the user into its in-memory queue (which is an ordered dictionary, as discussed above). If there are more than one user in the queue, the Template Actor 314 can filter the ordered dictionary for any matches with the maximum rating delta specified by the expansion algorithm. For each user that is within the maximum rating delta, the Template Actor 314 can schedule a match message that is calculated based on the differential (e.g., Elo differential) between the users. Although many match message may be sent, only the first message to be handled can represent a match. This allows the matchmaker engine 108 to identify the most fair match as fast as the expansion algorithm allows without polling any queue—the only time a search is performed on the queue is when a new users enters the queue. When the Template Actor 314 handles a match message, it can first check if both users are still in the queue. If not, then the message can be ignored. This may happen often if many match messages are handled. If both users are still in the queue, a match ID can be created (e.g., via UUID4, which is a randomly generated 128-bit universally unique identifier, or the like), a pending match data object can be created and stored in, for example, Mnesia, and a Match Actor 322 can be created that is addressable by the match ID. A dequeue message can be sent to each Template Actor 314, Template Actor 316, Template Actor 318, and Template Actor 320 in the enqueued template list. Each Player Actor (e.g., Player Actor 308, Player Actor 310, and Player Actor 312) can be sent a terminate message with the reason that a match has been found. When a Template Actor handles a dequeue message, the user can be removed from the ordered dictionary. When the Match Actor 322 handles a confirm message, it can add that user to the list of confirmed users. When the Match Actor 322 handles a ready to start message, it can check if both users have confirmed. If both users have confirmed, the matchmaker engine 108 can retrieve the client application server information for the match. For example, for a client application server from the plurality of client application servers 112, the matchmaker engine 108 can fetch an IP address/port pair from the hash ring for the given match ID. For a client application server from the client application server pool 120, the matchmaker engine 108 can request allocation of a warmed client application server from the warmed pool of client application servers 122 for the match.

Thus, template expansion performed by the matchmaker engine 108 can start by looking for the highest-rated selected template (e.g., the 10z template associated with the Template Actor 314 illustrated in FIG. 3) according to the template order within a specified skill range of the user 302 (e.g., according to Equation (5) or other expansion technique). Skill range expansion by the matchmaker engine 108 can occur after a calculated number of seconds (e.g., as determined by Equation (5) or other expansion technique) and is linked to each template. Independently, after a determined number of seconds, the matchmaker engine 108 can add the next highest rated template (e.g., the 5z template associated with the Template Actor 316 illustrated in FIG. 3) within the specified skill range of the user 302. Such an expansion process can continue until either a match is identified or the user 302 has reached the maximum skill range for each template selected. In some implementations of the present invention, the matching performed by matchmaker engine 108 can be limited to a predetermined time interval (e.g., 5 minutes, 1 hour, 1 day, etc.) so that matching does not continue indefinitely. According to such an embodiment, if a match is not found within the predetermined time interval (e.g., encompassing all selected templates), the user can be automatically awarded a win for the competition or tournament.

In some implementations of the present invention, for matchmaker polling, the matchmaker engine 108 can check for the existence of a pending match for a user in Mnesia and return the match ID if the pending match exists. Otherwise, the matchmaker engine 108 can return no content if a pending match is not found. For matchmaker confirm and check start, the matchmaker engine 108 can send a confirm message to the Match Actor 322.

Accordingly, for enqueue functions, message flows can pass from the gateway module 110 to the client application activity engine 104 and then to the matchmaker engine 108. For dequeue functions, messages flows can pass from the gateway module 110 to the matchmaker engine 108. For polling for a match, messages flows can pass from the gateway module 110 to the matchmaker engine 108. For confirming a match, message flows can pass from the gateway module 110 to the client application activity engine 104 and then to the matchmaker engine 108. For checking for a match start, message flows can pass from the gateway module 110 to the matchmaker engine 108.

In some implementations of the present invention, to ensure fair competition in synchronous client applications, the server system 102 can be configured to generate one or more pseudo-random number seeds for use by the synchronous client applications to generate one or more pseudo-random numbers. Since random numbers can be used in client application engines to decide client application elements and properties (e.g., in the context of mobile games, what obstacles are present can be decided based on the value that a random number generator returns), the use of common random numbers can provide a common client application experience to a subset of users (e.g., the users involved in a particular match, competition, or tournament in the client applications). The common client application experience can be used to standardize (or level the playing field) for a client application that still has random elements. For purposes of illustration and not limitation, while Tetris can be considered a game of skill, the order in which the Tetris pieces are presented to a user is normally random. By providing a common stream of pseudo-random number seeds to each client application instance participating in an online competition or tournament, the order of random elements (e.g., Tetris pieces) that appear to each user can be common across all participating client application instances. Thus, the results of a competitive tournament would be based entirely on skill, and not on a random chance of getting an easier order of, for instance, Tetris pieces presented. In some implementations of the present invention, the server system 102 can use a match ID (or other information that uniquely identifies a match) as a seed to generate one or more pseudo-random number seeds. The one or more pseudo-random number seeds can be characterized by the unique match ID. For example, the match ID can be used as an input to a suitable pseudo-random number seed generation algorithm to generate the one or more pseudo-random number seeds. Alternatively, one or more pseudo-random number seeds can be generated and associated with the match ID (e.g., in a lookup table or other suitable structure). The pseudo-random number seeds corresponding to the match ID can be retrieved by the server system 102 and transmitted to each user in the competition upon successful completion of the matching process discussed and described herein. The client application engine 136 in the respective client devices 134 of the users in the match can use the one or more pseudo-random number seeds (in a suitable pseudo-random number generator) to generate the same one or more pseudo-random numbers in the same order so that each user in the match can interact with the same client application experience (e.g., the same gameplay experience in the context mobile games). In other words, the one or more pseudo-random numbers can be used such that the beginning of the client application experience for the particular client application instance (e.g., a match, competition, or tournament) can be common between the users in that client application instance. However, the beginning of the client application experience can be different between client application instances enrolled in different matches, competitions, or tournament. Consequently, the client application interaction can be different between different matches, competitions, or tournaments, but not between client application instances involved in a given match, competition, or tournament.

In some implementations of the present invention, the server system 102 can use a tick-based processing system so that incoming messages are not processed until the next tick, and updates to the user are not broadcast or otherwise transmitted until the next tick. The tick-based processing system for server system 102 can have several purposes. For example, the tick-based processing system can provide a consistent service SLA. The server system 102 can respond at the tick rate interval, meaning that each broadcast remains consistent regardless of load on the server system 102. This is useful for providing a consistent user experience and supporting easier implementation of client-side interpolation of frames and the like. Additionally, the tick-based processing system can provide fair processing of client inputs. By setting a frame of reference, a tick can allow the server system 102 to define an interval for which inputs are said to have occurred "at the same time." For example, if the tick rate is set sufficiently high (higher than the latencies of both connected users), then there can be no fairness advantage for the user that is physically closer (or has a faster connection) to the server system 102. One potential problem that can be introduced with a tick-based processing system is that the server system 102 must determine an order in which to process messages that occurred within the same tick. For purposes of illustration and not limitation, two users in a mobile game click to pick up an item off the ground on the same tick. Which user should the server system 102 consider to have picked up the item? The server system 102 could assign an ID (e.g., based on IP address or other identifying information) to each user, and the order can remain static throughout the session. However, such a solution can be problematic, because the order can be discovered by users by viewing interactions with the mobile game, allowing them to gain an advantage. Alternatively, the server system 102 can periodically shuffle the order randomly. However, such a solution can also be problematic, because there may be intervals that can allow users to discover their advantage/disadvantage and abuse it, and randomization can be expensive from a computational perspective. To address these and other issues, in some implementations of the present invention, the server system 102 can simply reverse the order on every single tick. Such a solution is fast, because it does not rely on a randomization algorithm. Such a solution is also resilient to cheating, because each users' inputs become shuffled tens of times per second or more, preventing users from being able to identify when they have an advantage. Even if a user could identify when they have an advantage, it would be shuffled many times before they have time to use the advantage.

In some implementations of the present invention, one or more of the client application servers can used by the server system 102 as authoritative client application servers. In an embodiment, any or all client application state information can be stored on an authoritative client application server. In such a configuration, the client devices 134 are not considered "trusted." Each client device 134 can send requests to adjust the client application state information (e.g., during a match, competition, or tournament) to the server system 102, which can be forwarded to and processed by the authoritative client application server. The authoritative client application server can validate the requests. If the request is validated, the authoritative client application server can then broadcast the updated client application state information on the next tick. Such a mechanism can guarantee that there is no cheating in relation to the client devices 134 during a match, competition, or tournament, as requests that are not validated or are otherwise determined to be invalid by the authoritative client application server would not be processed. At the end of the match, competition, or tournament, the client application server can report the client application state information (e.g., score or the like) of both users directly to the server system 102 (e.g., the matchmaker engine 108). Such server-to-server client application state information reporting can significantly improve the resiliency of the server system 102 to, for example, man-in-the-middle (MITM) or other malicious attacks on the system 100 that can deleteriously affect other less-robust client application server architectures (e.g., peer-to-peer, deterministic lockstep, etc.).

In some implementations of the present invention, a matchmaker token can be used to prevent MITM and other like malicious attacks by guaranteeing to the client application servers that a match, competition, or tournament came from the matchmaker engine 108. In an embodiment, when a match is made, the matchmaker engine 108 can asymmetrically encrypt (e.g., via RSA or other suitable encryption algorithm) the current timestamp (e.g., of when the match was identified or otherwise created) and can send a matchmaker token with the encrypted timestamp to the client device 134, along with the IP/port of the client application server to which the client device 134 is to connect (as discussed above). When connecting to the indicated client application server, the client application 138 (via the SDK module 140) can pass the encrypted token back to the client application server. The client application server can attempt to decrypt the encrypted token. The client application server can only successfully decrypt the encrypted token if it was encrypted by the key that is maintained and used by the matchmaker engine 108. If successfully decrypted, the client application server can "see" or otherwise access the timestamp of when the match was identified or created, thus confirming that the match, competition or tournament came from or was otherwise originated by the matchmaker engine 108. In such a manner, the client application server can reject connections associated with matches, competitions, or tournaments that are not from the matchmaker engine 108. In some implementations of the present application, the timestamp can have or be associated with an expiration period or window (e.g., 1 hour after the match was created, 1 day after the match was created, or the like). Consequently, once the client application server successfully decrypts the timestamp, the client application server can analyze the timestamp to determine if the token has expired (i.e., the timestamp is beyond the expiration window). If the token has expired, the client application server can reject the connection associated with the given match, competition, or tournament. In such a manner, the client application server can prevent long-expired matches, competitions, or tournaments from being potentially used for malicious attacks against the server system 102.

Figure 4:
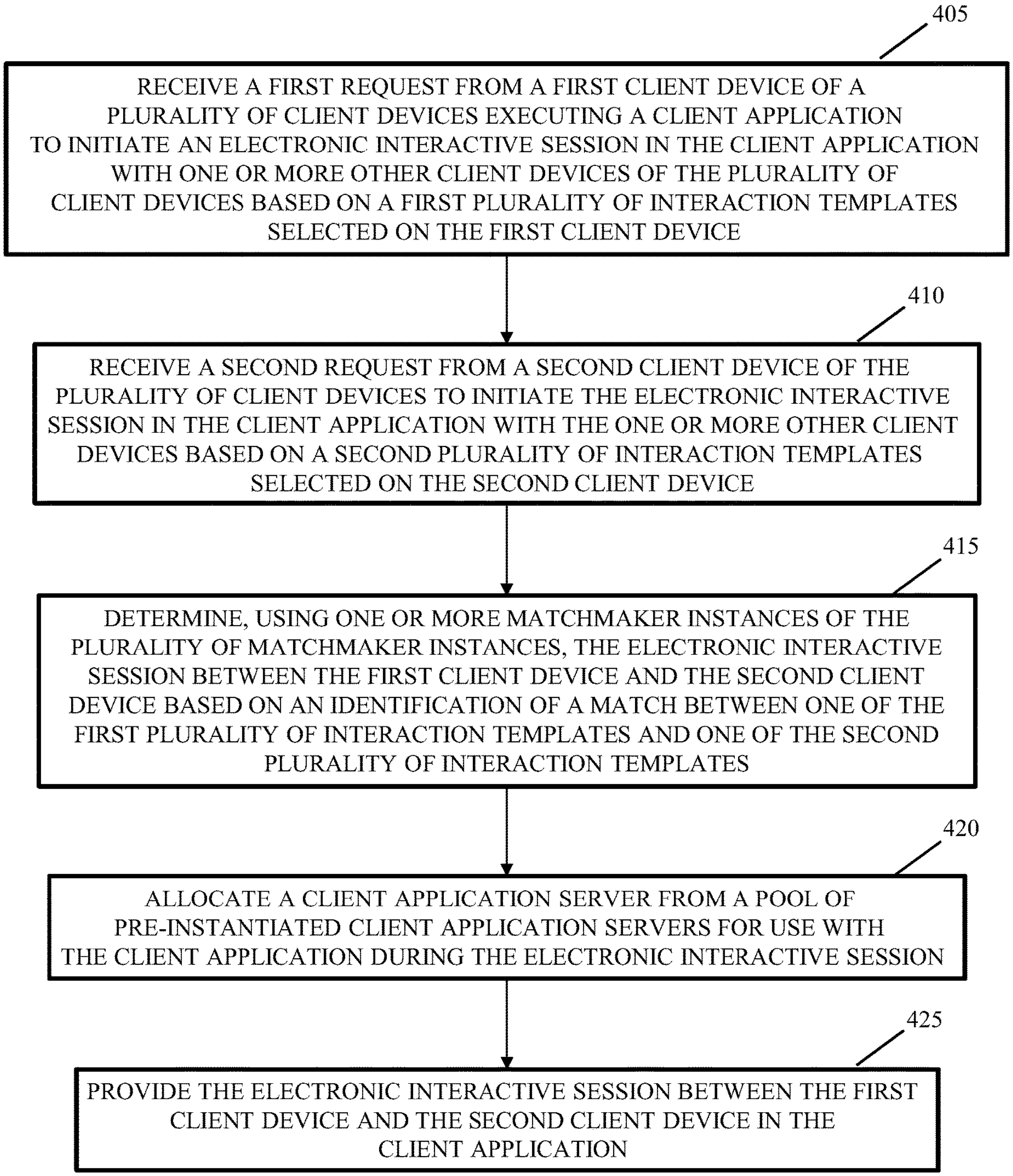
FIG. 4 is a flowchart of an example method for managing interactions between users of client applications.

FIG. 4 is a flowchart of an example method 400 for managing interactions between users of client applications. In some implementations of the present invention, the method 400 can be performed by the server system 102. At block 405, the server system 102 can receive a first request from a first client device (e.g., one of the client devices 134) of a plurality of client devices executing a client application (e.g., client application 138) to initiate an electronic interactive session in the client application with one or more other client devices of the plurality of client devices based on a first plurality of interaction templates selected on the first client device. In an embodiment, the first client device can be enqueued simultaneously in each of the first plurality of interaction templates. In an embodiment, each of the first plurality of interaction templates can be associated with a different respective matchmaker instance of a plurality of matchmaker instances. At block 410, the server system 102 can receive a second request from a second client device (e.g., one of the client devices 134) of the plurality of client devices to initiate the electronic interactive session in the client application with the one or more other client devices based on a second plurality of interaction templates selected on the second client device. In an embodiment, the second client device can be enqueued simultaneously in each of the second plurality of interaction templates. At block 415, the server system 102 can determine, using one or more matchmaker instances of the plurality of matchmaker instances (e.g., via the matchmaker engine 108 using the actor design patterns), the electronic interactive session between the first client device and the second client device based on an identification of a match between one of the first plurality of interaction templates and one of the second plurality of interaction templates. At block 420, the server system 102 can allocate a client application server from a pool of pre-instantiated client application servers (e.g., client application server pool 120) for use with the client application during the electronic interactive session, wherein another pre-instantiated client application server is added to the pool of pre-instantiated client application servers (e.g., from the client application server pool repository) to replace the client application server that is allocated. At block 425, the server system 102 can provide the electronic interactive session between the first client device and the second client device in the client application. In an embodiment, the allocated client application server can be deallocated at a conclusion of the electronic interactive session.

The subject matter described herein provides many technical advantages. For example, by using one client actor per client application template, the present invention can support linear scaling and in-memory matching, does not require memory locking or duplicate work, and can be event driven, thereby substantially improving computer resource utilization. In other words, by using template actors, the matchmaker engine 108 can scale to support concurrent matchmaking for large numbers of users, such as hundreds of thousands, millions, tens of millions, or more users. Thus, some implementations of the present invention can improve the efficiency and processing capabilities of computer hardware resources (e.g., computer processing and memory) to identify matches by supporting and providing substantially faster matching times, particularly for client applications with large numbers of users. For example, some implementations of the present invention can more efficiently handle large numbers of users enqueuing and identifying matches in a plurality of templates at the same time. By improving the matching speed and efficiency for client applications with large numbers of users, computer hardware resources can be freed up more quickly and used for other tasks and processes, resulting in a significant improvement in computer resource utilization.

Figure 5:
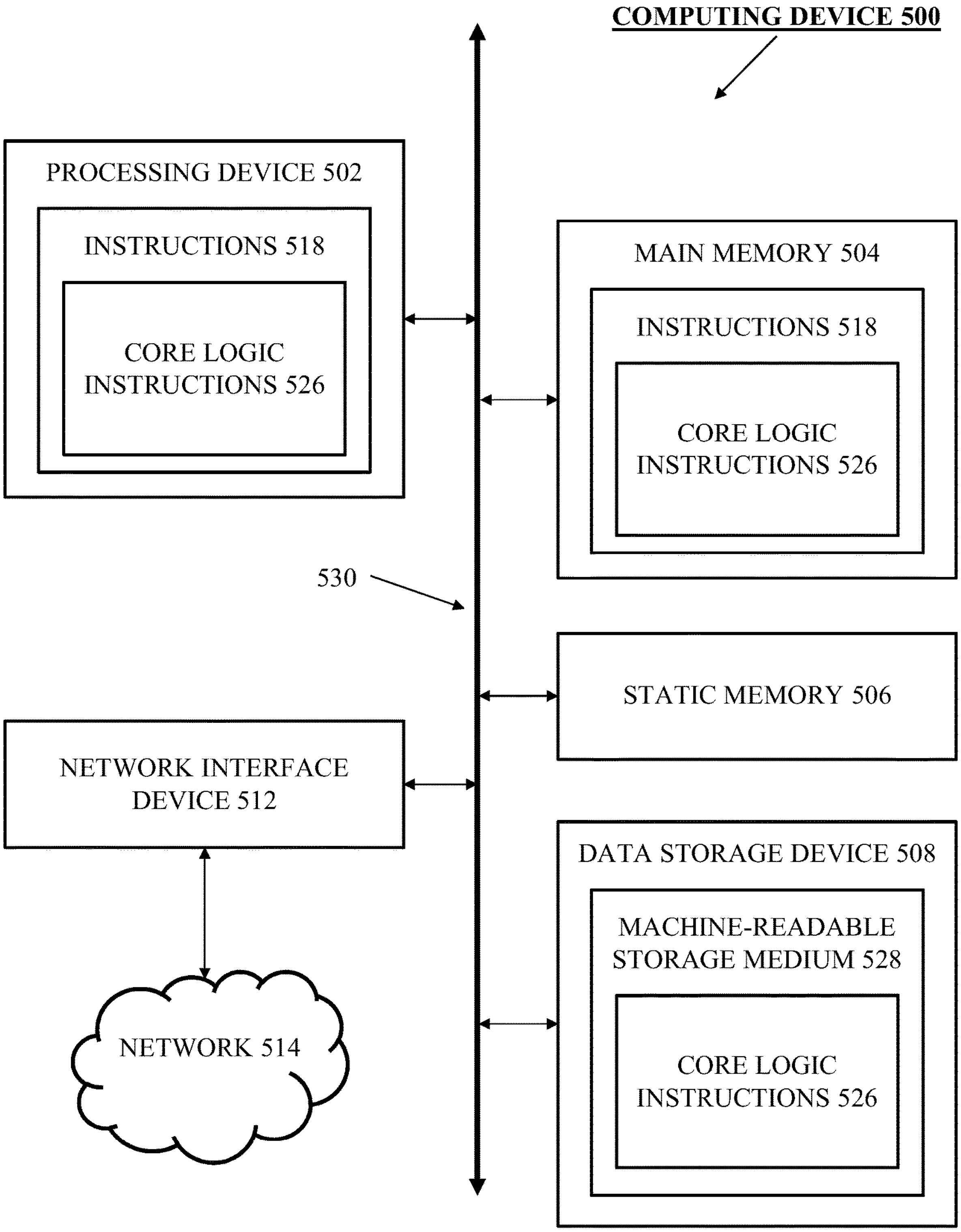
FIG. 5 is a block diagram of an example computing device that may perform one or more of the operations described herein, in accordance with the present embodiments.

FIG. 5 is a block diagram of an example computing device 500 that may perform one or more of the operations described herein, in accordance with the present embodiments. The computing device 500 may be connected to other computing devices in a LAN, an intranet, an extranet, and/or the Internet. The computing device 500 may operate in the capacity of a server machine in client-server network environment or in the capacity of a client in a peer-to-peer network environment. The computing device 500 may be provided by a personal computer (PC), a set-top box (STB), a server, a network router, switch or bridge, or any machine capable of executing a set of instructions (sequential or otherwise) that specify actions to be taken by that machine. Further, while only a single computing device 500 is illustrated, the term "computing device" shall also be taken to include any collection of computing devices that individually or jointly execute a set (or multiple sets) of instructions to perform the methods discussed herein.

The example computing device 500 may include a computer processing device 502 (e.g., a general purpose processor, ASIC, etc.), a main memory 504, a static memory 506 (e.g., flash memory or the like), and a data storage device 508, which may communicate with each other via a bus 530. The computer processing device 502 may be provided by one or more general-purpose processing devices such as a microprocessor, central processing unit, or the like. In an illustrative example, computer processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The computer processing device 502 may also comprise one or more special-purpose processing devices, such as an application specific integrated circuit (ASIC), a field programmable gate array (FPGA), a digital signal processor (DSP), network processor, or the like. The computer processing device 502 may be configured to execute the operations described herein, in accordance with one or more aspects of the present disclosure, for performing the operations and steps discussed herein.

The computing device 500 may further include a network interface device 512, which may communicate with a network 514. The data storage device 508 may include a machine-readable storage medium 528 on which may be stored one or more sets of instructions, e.g., instructions for carrying out the operations described herein, in accordance with one or more aspects of the present disclosure. Instructions 518 implementing core logic instructions 526 may also reside, completely or at least partially, within main memory 504 and/or within computer processing device 502 during execution thereof by the computing device 500, main memory 504 and computer processing device 502 also constituting computer-readable media. The instructions may further be transmitted or received over the network 514 via the network interface device 512.

While machine-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, magnetic media, and the like.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, solid state drives, or the like. However, a computer need not have such devices. Moreover, a computer can be embedded in another device, e.g., a smart phone, a mobile audio or media user, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor, a light emitting diode (LED) monitor, or the like, for displaying information to the user and a keyboard and a pointing device, e.g., a mouse, a trackball, a touchpad, a stylus, or the like, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like. In addition, a computer can interact with a user by sending resources to and receiving resources from a device that is used by the user; for example, by sending web pages to a web browser on a user's client device in response to requests received from the web browser.

Embodiments of the subject matter described in this disclosure can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), peer-to-peer networks (e.g., ad hoc peer-to-peer networks), and the like.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Reference throughout this disclosure to "one embodiment" or "an embodiment" means that a particular feature, structure, or characteristic described in connection with the embodiments included in at least one embodiment. Thus, the appearances of the phrase "in one embodiment" or "in an embodiment" in various places throughout this disclosure are not necessarily all referring to the same embodiment. In addition, the term "or" is intended to mean an inclusive "or" rather than an exclusive "or."

While this disclosure contains many specific implementation details, these should not be construed as limitations on the scope of any inventions or of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations and/or logic flows are depicted in the drawings and/or described herein in a particular order, this should not be understood as requiring that such operations and/or logic flows be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The above description of illustrated implementations of the invention is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

Further non-limiting aspects or embodiments are set forth in the following numbered clauses:

Clause 1: A method comprising receiving, by at least one data processor, a first request from a first client device executing a client application for initiating an electronic interactive session in the client application with one or more additional client devices, the first request based on a first plurality of interaction templates associated with the first client device, the first plurality of interaction templates associated with a respective plurality of actors, each actor of the respective plurality of actors independent of remaining actors of the respective plurality of actors, receiving, by the at least one data processor, a second request from a second client device to initiate the electronic interactive session in the client application with the one or more additional client devices, the second request based on a second plurality of interaction templates associated with the second client device, the second plurality of interaction templates associated with a respective plurality of additional actors, each actor of the respective plurality of additional actors independent of remaining actors of the respective plurality of additional actors, determining, by the at least one data processor using one or more matchmaker instances, the electronic interactive session between the first client device and the second client device based on an identification of a match between one of the first plurality of interaction templates and one of the second plurality of interaction templates selected on the second client device, the identification of the match based on a concurrent processing model enabling scaling to a plurality of servers independent of an architectural modification any of the plurality of servers, allocating, by the at least one data processor, a client application server from a pool of pre-instantiated client application servers for use with the client application during the electronic interactive session, and providing, by the at least one data processor, the electronic interactive session between the first client device and the second client device in the client application.

Clause 2: The method of clause 1, wherein the first client device is enqueued simultaneously in each of the first plurality of interaction templates, and another pre-instantiated client application server is added to the pool of pre-instantiated client application servers to replace the client application server that is allocated.

Clause 3: The method of clause 1, wherein each of the first plurality of interaction templates is associated with a respective matchmaker instance of a plurality of matchmaker instances.

Clause 4: The method of clause 1, wherein the second client device is enqueued simultaneously in each of the second plurality of interaction templates.

Clause 5: The method of clause 1, wherein the respective plurality of actors and the respective plurality of additional actors comprise behavior or logic.

Clause 6: The method of clause 1, wherein a first actor of the respective plurality of actors capable of a modification a state specific the first actor, the modification independent of the remaining actors of the respective plurality of actors, and a second actor of the respective additional plurality of actors capable of an additional modification of an additional state specific to the second actor, the additional modification independent of the remaining actors of the respective plurality of additional actors.

Clause 7: The method of clause 6, wherein the client application server that is allocated is deallocated at a conclusion of the electronic interactive session, the first plurality of interaction templates selected on the first client device, and the second plurality of interaction templates selected on the second client device.

Clause 8: A system, comprising: at least one data processor, and memory storing instructions, which, when executed by the at least one data processor, cause the at least one data processor to perform operations comprising, receiving, by the at least one data processor, a first request from a first client device executing a client application for initiating an electronic interactive session in the client application with one or more additional client devices, the first request based on a first plurality of interaction templates associated with the first client device, the first plurality of interaction templates associated with a respective plurality of actors, each actor of the respective plurality of actors independent of remaining actors of the respective plurality of actors, receiving, by the at least one data processor, a second request from a second client device to initiate the electronic interactive session in the client application with the one or more additional client devices, the second request based on a second plurality of interaction templates associated with the second client device, the second plurality of interaction templates associated with a respective plurality of additional actors, each actor of the respective plurality of additional actors independent of remaining actors of the respective plurality of additional actors, determining, by the at least one data processor using one or more matchmaker instances, the electronic interactive session between the first client device and the second client device based on an identification of a match between one of the first plurality of interaction templates and one of the second plurality of interaction templates selected on the second client device, the identification of the match based on a concurrent processing model enabling scaling to a plurality of servers independent of an architectural modification any of the plurality of servers, allocating, by the at least one data processor, a client application server from a pool of pre-instantiated client application servers for use with the client application during the electronic interactive session, and providing, by the at least one data processor, the electronic interactive session between the first client device and the second client device in the client application.

Clause 9: The system of clause 8, wherein the first client device is enqueued simultaneously in each of the first plurality of interaction templates, and another pre-instantiated client application server is added to the pool of pre-instantiated client application servers to replace the client application server that is allocated.

Clause 10: The system of clause 8, wherein each of the first plurality of interaction templates is associated with a respective matchmaker instance of a plurality of matchmaker instances.

Clause 11: The system of clause 8, wherein the second client device is enqueued simultaneously in each of the second plurality of interaction templates.

Clause 12: The system of clause 8, wherein a first actor of the respective plurality of actors capable of a modification a state specific the first actor, the modification independent of the remaining actors of the respective plurality of actors, and a second actor of the respective additional plurality of actors capable of an additional modification of an additional state specific to the second actor, the additional modification independent of the remaining actors of the respective plurality of additional actors.

Clause 13: The system of clause 8, wherein the client application server that is allocated is deallocated at a conclusion of the electronic interactive session.

Clause 14: The system of clause 13, wherein the first plurality of interaction templates selected on the first client device, and the second plurality of interaction templates selected on the second client device.

Clause 15: A non-transitory computer program product storing executable instructions, which, when executed by at least one data processor forming part of at least one computing system, implement operations comprising receiving a first request from a first client device executing a client application for initiating an electronic interactive session in the client application with one or more additional client devices, the first request based on a first plurality of interaction templates associated with the first client device, the first plurality of interaction templates associated with a respective plurality of actors, each actor of the respective plurality of actors independent of remaining actors of the respective plurality of actors, receiving a second request from a second client device to initiate the electronic interactive session in the client application with the one or more additional client devices, the second request based on a second plurality of interaction templates associated with the second client device, the second plurality of interaction templates associated with a respective plurality of additional actors, each actor of the respective plurality of additional actors independent of remaining actors of the respective plurality of additional actors, determining, using one or more matchmaker instances, the electronic interactive session between the first client device and the second client device based on an identification of a match between one of the first plurality of interaction templates and one of the second plurality of interaction templates selected on the second client device, the identification of the match based on a concurrent processing model enabling scaling to a plurality of servers independent of an architectural modification any of the plurality of servers, allocating a client application server from a pool of pre-instantiated client application servers for use with the client application during the electronic interactive session, and providing the electronic interactive session between the first client device and the second client device in the client application.

Clause 16: The non-transitory computer program product of clause 15, wherein the first client device is enqueued simultaneously in each of the first plurality of interaction templates, each of the first plurality of interaction templates is associated with a respective matchmaker instance of a plurality of matchmaker instances, and another pre-instantiated client application server is added to the pool of pre-instantiated client application servers to replace the client application server that is allocated.

Clause 17: The non-transitory computer program product of clause 15, wherein the second client device is enqueued simultaneously in each of the second plurality of interaction templates.

Clause 18: The non-transitory computer program product of clause 15, wherein the determining of the electronic interactive session between the first client device and the second client device based on an identification of a match between one of the first plurality of interaction templates and one of the second plurality of interaction templates.

Clause 19: The non-transitory computer program product of clause 15, wherein the respective plurality of actors and the respective plurality of additional actors comprise behavior or logic.

Clause 20: The non-transitory computer program product of clause 15, the client application server that is allocated is deallocated at a conclusion of the electronic interactive session, the first plurality of interaction templates selected on the first client device, and the second plurality of interaction templates selected on the second client device.

What is claimed is:

1. A method comprising:

receiving, by at least one data processor, a first request from a first client device executing a client application for initiating an electronic interactive session in the client application with one or more additional client devices, the first request based on a first plurality of interaction templates associated with the first client device, each of the first plurality of interaction templates being associated with a respective template actor configured to maintain a matchmaking queue and to operate independently of template actors associated with other interaction templates of the first plurality of interaction templates, wherein the first request is enqueued in the matchmaking queue;

receiving, by the at least one data processor, a second request from a second client device to initiate the electronic interactive session in the client application with the one or more additional client devices, the second request based on a second plurality of interaction templates associated with the second client device, each of the second plurality of interaction templates being associated with a respective additional template actor configured to maintain an additional matchmaking queue and to operate independently of additional template actors associated with other interaction templates of the second plurality of interaction templates, wherein the second request is enqueued in the additional matchmaking queue;

determining, by the at least one data processor using one or more matchmaker instances, the electronic interactive session between the first client device and the second client device based on an identification of a match between one of the first plurality of interaction templates associated with the first client device and one of the second plurality of interaction templates associated with the second client device, wherein the identification of the match comprises concurrently searching the matchmaking queue and the additional matchmaking queue to determine that both the first request and the second request are in the queue;

allocating, by the at least one data processor, a client application server from a pool of pre-instantiated client application servers for use with the client application during the electronic interactive session; and providing, by the at least one data processor, the electronic interactive session between the first client device and the second client device in the client application.

2. The method of claim 1, wherein:

the first request is enqueued simultaneously in the matchmaking queue of the template actor associated with each of the first plurality of interaction templates; and another pre-instantiated client application server is added to the pool of pre-instantiated client application servers to replace the client application server that is allocated.

3. The method of claim 1, wherein each of the first plurality of interaction templates is associated with a respective matchmaker instance of a plurality of matchmaker instances.

4. The method of claim 1, wherein the second request is enqueued simultaneously in the additional matchmaking queue of the additional template actor associated with each of the second plurality of interaction templates.

5. The method of claim 1, wherein the template actor and the additional template actor comprise behavior or logic.

6. The method of claim 1, wherein:

the template actor is capable of modifying a state associated with the template actor, the modification being independent of states of the template actors associated with the other interaction templates of the first plurality of interaction templates; and the additional template actor is capable of modifying a state associated with the additional template actor, the modification being independent of states of the additional template actors associated with the other interaction templates of the second plurality of interaction templates.

7. The method of claim 6, wherein:

the client application server that is allocated is deallocated at a conclusion of the electronic interactive session;

the first plurality of interaction templates is selected on the first client device; and the second plurality of interaction templates is selected on the second client device.

8. A system, comprising:

at least one data processor; and memory storing instructions, which, when executed by the at least one data processor, cause the at least one data processor to perform operations comprising:

receiving, by the at least one data processor, a first request from a first client device executing a client application for initiating an electronic interactive session in the client application with one or more additional client devices, the first request based on a first plurality of interaction templates associated with the first client device, each of the first plurality of interaction templates being associated with a respective template actor configured to maintain a matchmaking queue and to operate independent of template actors associated with other interaction templates of the first plurality of interaction templates, wherein the first request is enqueued in the matchmaking queue;

receiving, by the at least one data processor, a second request from a second client device to initiate the electronic interactive session in the client application with the one or more additional client devices, the second request based on a second plurality of interaction templates associated with the second client device, each of the second plurality of interaction templates being associated with a respective additional template actor configured to maintain an additional matchmaking queue and to operate independently of additional template actors associated with other interaction templates of the second plurality of interaction templates, wherein the second request is enqueued in the additional matchmaking queue;

determining, by the at least one data processor using one or more matchmaker instances, the electronic interactive session between the first client device and the second client device based on an identification of a match between one of the first plurality of interaction templates associated with the first client device and one of the second plurality of interaction templates associated with the second client device, wherein the identification of the match comprises concurrently searching the matchmaking queue and the additional matchmaking queue to determine that both the first request and the second request are in the queue;

allocating, by the at least one data processor, a client application server from a pool of pre-instantiated client application servers for use with the client application during the electronic interactive session; and providing, by the at least one data processor, the electronic interactive session between the first client device and the second client device in the client application.

9. The system of claim 8, wherein:

the first request is enqueued simultaneously in the matchmaking queue of the template actor associated with each of the first plurality of interaction templates; and another pre-instantiated client application server is added to the pool of pre-instantiated client application servers to replace the client application server that is allocated.

10. The system of claim 8, wherein each of the first plurality of interaction templates is associated with a respective matchmaker instance of a plurality of matchmaker instances.

11. The system of claim 8, wherein the second request is enqueued simultaneously in the additional matchmaking queue of the additional template actor associated with each of the second plurality of interaction templates.

12. The system of claim 8, wherein:

The template actor is capable of modifying a state associated with the first template actor, the modification being independent of states of the template actors associated with the other interaction templates of the first plurality of interaction templates; and The additional template actor is capable of modifying a state associated with the additional template actor, the modification being independent of states of the additional template actors associated with the other interaction templates of the second plurality of interaction templates.

13. The system of claim 8, wherein the client application server that is allocated is deallocated at a conclusion of the electronic interactive session.

14. The system of claim 13, wherein:

the first plurality of interaction templates is selected on the first client device; and the second plurality of interaction templates is selected on the second client device.

15. A non-transitory computer program product storing executable instructions, which, when executed by at least one data processor forming part of at least one computing system, implement operations comprising:

receiving a first request from a first client device executing a client application for initiating an electronic interactive session in the client application with one or more additional client devices, the first request based on a first plurality of interaction templates associated with the first client device, each of the first plurality of interaction templates being associated with a respective template actor configured to maintain a matchmaking queue and to operate independently of template actors associated with other interaction templates of the first plurality of interaction templates, wherein the first request is enqueued in the matchmaking;

receiving a second request from a second client device to initiate the electronic interactive session in the client application with the one or more additional client devices, the second request based on a second plurality of interaction templates associated with the second client device, each of the second plurality of interaction templates being associated with a respective additional template actor configured to maintain an additional matchmaking queue and to operate independently of additional template actors associated with other interaction templates of the second plurality of interaction templates, wherein the second request is enqueued in the additional matchmaking queue;

determining, using one or more matchmaker instances, the electronic interactive session between the first client device and the second client device based on an identification of a match between one of the first plurality of interaction templates associated with the first client device and one of the second plurality of interaction templates associated with the second client device, wherein the identification of the match comprises concurrently searching the matchmaking queue and the additional matchmaking queue to determine that both the first request and the second request are in the queue;

allocating a client application server from a pool of pre-instantiated client application servers for use with the client application during the electronic interactive session; and providing the electronic interactive session between the first client device and the second client device in the client application.

16. The non-transitory computer program product of claim 15, wherein:

the first request is enqueued simultaneously in the matchmaking queue of the template actor associated with each of the first plurality of interaction templates;

each of the first plurality of interaction templates is associated with a respective matchmaker instance of a plurality of matchmaker instances; and another pre-instantiated client application server is added to the pool of pre-instantiated client application servers to replace the client application server that is allocated.

17. The non-transitory computer program product of claim 15, wherein the second request is enqueued simultaneously in the additional matchmaking queue of the additional template actor associated with each of the second plurality of interaction templates.

18. The non-transitory computer program product of claim 15, wherein the template actor and the additional template actor comprise behavior or logic.

19. The non-transitory computer program product of claim 15, wherein:

the client application server that is allocated is deallocated at a conclusion of the electronic interactive session;

the first plurality of interaction templates is selected on the first client device; and the second plurality of interaction templates is selected on the second client device.

* * * * *